United States Patent
Habibvand et al.

(10) Patent No.: US 9,561,845 B2
(45) Date of Patent: Feb. 7, 2017

(54) BEARING INSTALLED ON AN AIRCRAFT STRUCTURE

(71) Applicant: Roller Bearing Company of America, Inc., Oxford, CT (US)

(72) Inventors: Alex Habibvand, Orange, CA (US); John H. Cowles, Jr., Unionville, CT (US); Richard Murphy, Torrington, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 32 days.

(21) Appl. No.: 14/728,452

(22) Filed: Jun. 2, 2015

(65) Prior Publication Data

US 2015/0336658 A1     Nov. 26, 2015

Related U.S. Application Data

(60) Continuation-in-part of application No. 13/719,541, filed on Dec. 19, 2012, which is a continuation-in-part
(Continued)

(51) Int. Cl.
    *B64C 9/22*      (2006.01)
    *B64C 9/16*      (2006.01)
(Continued)

(52) U.S. Cl.
CPC . *B64C 9/16* (2013.01); *B64C 9/02* (2013.01); *B64C 9/22* (2013.01); *F16C 11/0614* (2013.01);
(Continued)

(58) Field of Classification Search
CPC .............. F16C 33/44; F16C 33/36; B64C 9/22
(Continued)

(56) References Cited

U.S. PATENT DOCUMENTS 1,199,404 A    9/1916   Miller
1,376,310 A    4/1921   Armstrong
(Continued)

FOREIGN PATENT DOCUMENTS

CN     100436851 C    11/2008
DE     2800854 A1    7/1978
(Continued)

OTHER PUBLICATIONS

Office Communication issued in corresponding European Application No. 14198599.4, dated May 11, 2016, pp. 1-5.
(Continued)

*Primary Examiner* — Brian M O'Hara
*Assistant Examiner* — Keith L Dixon
(74) *Attorney, Agent, or Firm* — MKG LLC

(57) ABSTRACT

An edge flap arrangement for an aircraft wing includes a main flap element and an actuator. A linkage arrangement supports the main flap. The linkage arrangement includes a drop hinge link arrangement. The drop hinge link arrangement includes a fixed strut and a drop link. The fixed strut and the drop link are pivotally connected by a hinge point. The hinge point includes an hourglass bearing. The hourglass bearing includes an inner member, an outer member, and a plurality of hourglass rollers. Any combination of the inner member, the outer member, and the hourglass rollers are fabricated from CREN, Cronidur 30, XD15NW, 422 Stainless Steel, CRES, and/or 440C Stainless Steel. A cage is disposed between the inner member and the outer member. The cage includes a plurality of first rails and a plurality of second rails. Opposing pairs of first rails and second rails define a plurality of pockets.

4 Claims, 25 Drawing Sheets

Related U.S. Application Data of application No. 13/114,099, filed on May 24, 2011, now Pat. No. 8,387,924, which is a division of application No. 12/201,062, filed on Aug. 29, 2008, now Pat. No. 8,025,257.

(60) Provisional application No. 62/007,214, filed on Jun. 3, 2014, provisional application No. 62/090,257, filed on Dec. 10, 2014, provisional application No. 60/992,746, filed on Dec. 6, 2007.

(51) Int. Cl.

| | | |
|---|---|---|
| *B64C 9/02* | (2006.01) | |
| *F16C 23/08* | (2006.01) | |
| *F16C 33/78* | (2006.01) | |
| *F16C 11/06* | (2006.01) | |
| *F16C 33/36* | (2006.01) | |
| *F16C 33/48* | (2006.01) | |
| *F16C 33/49* | (2006.01) | |

(52) U.S. Cl.
CPC ............. *F16C 23/086* (2013.01); *F16C 33/36* (2013.01); *F16C 33/48* (2013.01); *F16C 33/495* (2013.01); *F16C 33/784* (2013.01); *F16C 33/7806* (2013.01)

(58) Field of Classification Search
USPC .......................................................... 244/214
See application file for complete search history.

(56) References Cited

U.S. PATENT DOCUMENTS

| | | | |
|---|---|---|---|
| 1,901,967 A | | 3/1933 | Hoover |
| 2,387,962 A | | 10/1945 | Williams |
| 2,678,246 A | | 5/1954 | Potter |
| 2,764,432 A | | 9/1956 | Leister et al. |
| 2,767,037 A | | 10/1956 | Williams |
| 3,594,851 A | | 7/1971 | Swatton |
| 4,049,219 A | | 9/1977 | Dean et al. |
| 4,557,613 A | | 12/1985 | Tallian et al. |
| 4,714,358 A | | 12/1987 | Bayer et al. |
| 4,929,098 A | | 5/1990 | Takata et al. |
| 5,310,269 A | | 5/1994 | Wardle et al. |
| 5,441,351 A | * | 8/1995 | Grunze ................. F16C 23/086 384/450 |
| 5,586,826 A | | 12/1996 | Kellstrom et al. |
| 5,667,312 A | | 9/1997 | Grunze et al. |
| 6,315,458 B1 | * | 11/2001 | Unno ..................... F16C 19/26 384/565 |
| 6,390,685 B1 | | 5/2002 | Shimomura et al. |
| 6,394,656 B1 | | 5/2002 | Williams |
| 7,959,678 B2 | | 6/2011 | Filippi et al. |
| 8,025,257 B2 | | 9/2011 | Gyuricsko et al. |
| 8,070,106 B2 | | 12/2011 | Engelbrecht et al. |
| 8,534,612 B2 | | 9/2013 | Morris |
| 8,567,727 B2 | | 10/2013 | Morris |
| 8,714,493 B2 | | 5/2014 | Morris |
| 8,753,457 B2 | | 6/2014 | Moyer |
| 2005/0069239 A1 | | 3/2005 | Yamamoto et al. |
| 2006/0115193 A1 | | 6/2006 | Begin |
| 2008/0040886 A1 | | 2/2008 | Arnold et al. |
| 2008/0219834 A1 | | 9/2008 | Merfeld et al. |
| 2009/0169145 A1 | | 7/2009 | Obayashi et al. |
| 2010/0027933 A1 | | 2/2010 | Locke et al. |
| 2010/0033965 A1 | | 2/2010 | Casey et al. |
| 2010/0150486 A1 | | 6/2010 | Kuppuraju et al. |
| 2010/0215303 A1 | | 8/2010 | Shaikh |
| 2011/0064348 A1 | | 3/2011 | Jacob et al. |
| 2011/0086754 A1 | | 4/2011 | Gentleman et al. |
| 2011/0127386 A1 | | 6/2011 | Morris |
| 2011/0182539 A1 | | 7/2011 | Kolar |
| 2011/0220762 A1 | | 9/2011 | Gyuricsko et al. |
| 2011/0274382 A1 | | 11/2011 | Berns et al. |
| 2011/0293212 A1 | | 12/2011 | Kobayashi |
| 2011/0317952 A1 | | 12/2011 | Heaton et al. |
| 2012/0082409 A1 | | 4/2012 | Miyachi |
| 2012/0263405 A1 | | 10/2012 | Mizuki et al. |
| 2012/0291625 A1 | | 11/2012 | Habibvand |
| 2013/0087662 A1 | | 4/2013 | Soenarjo |
| 2013/0108200 A1 | | 5/2013 | Berns |
| 2013/0112814 A1 | | 5/2013 | Yue |
| 2013/0142471 A1 | | 6/2013 | Muller et al. |
| 2014/0193112 A1 | | 7/2014 | Caspall |
| 2014/0301680 A1 | | 10/2014 | Tecza et al. |
| 2014/0301689 A1 | | 10/2014 | Honjo |
| 2014/0334761 A1 | | 11/2014 | Hewitt et al. |
| 2014/0339369 A1 | | 11/2014 | Habibvand |
| 2014/0345141 A1 | | 11/2014 | Gonzalez et al. |
| 2014/0369634 A1 | | 12/2014 | Kane |
| 2015/0078699 A1 | | 3/2015 | Gessendorfer et al. |

FOREIGN PATENT DOCUMENTS

| | | |
|---|---|---|
| DE | 19612571 A1 | 10/1997 |
| DE | 102006050940 A1 | 4/2008 |
| DE | 102009042941 A1 | 3/2011 |
| EP | 189365 A1 | 7/1986 |
| EP | 0649990 A1 | 4/1995 |
| EP | 1315914 B1 | 10/2005 |
| EP | 2354579 A2 | 8/2011 |
| EP | 2589829 A1 | 5/2013 |
| EP | 2067696 B1 | 8/2013 |
| GB | 2237336 A | 5/1991 |
| GB | 2428996 A | 2/2007 |
| JP | 2006071091 A | 3/2006 |
| JP | 2006266277 A | 5/2006 |
| JP | 2008286330 A | 11/2008 |
| JP | 2012017770 A | 1/2012 |
| JP | 2012202453 A | 10/2012 |
| JP | 2013145012 A | 7/2013 |
| JP | 2014018825 A | 2/2014 |
| WO | 0125647 A1 | 4/2001 |
| WO | 2007074691 A1 | 7/2007 |
| WO | 2007125001 A2 | 11/2007 |
| WO | 2011140230 A1 | 11/2011 |
| WO | 2012129223 A1 | 9/2012 |
| WO | 2013122526 A1 | 8/2013 |
| WO | 2013129645 A1 | 9/2013 |
| WO | 2014021958 A1 | 2/2014 |
| WO | 2014182569 A2 | 11/2014 |
| WO | 2015031247 A2 | 3/2015 |

OTHER PUBLICATIONS

Extended European Search Report for EP14198599.4-1751/2894359, dated Jun. 17, 2015.
Extended European Search Report for EP15170500.1-1751, dated Nov. 11, 2015.
Extended European Search Report for European Patent Application No. 15170493.9-1760 / 2952760, dated Jan. 4, 2016.
Extended European Search Report for EP Patent Application No. 15170498.8-1760/2957781, dated Feb. 5, 2016.

\* cited by examiner

BEARING INSTALLED ON AN AIRCRAFT STRUCTURE

CROSS REFERENCE TO RELATED APPLICATIONS

This patent application claims the benefit of U.S. Provisional Patent Application Ser. Nos. 62/007,214, filed on Jun. 3, 2014 and 62/090,257, filed on Dec. 10, 2014. This application is also a continuation in part of and claims priority benefit under 35 U.S.C. §120 to U.S. patent application Ser. No. 13/719,541 filed Dec. 19, 2012 which is a continuation in part of and claims priority benefit to U.S. patent application Ser. No. 13/114,099, filed May 24, 2011, issued as U.S. Pat. No. 8,387,924 on Mar. 5, 2013 and which is a divisional application of and claims priority benefit under 35 U.S.C. §120 to U.S. patent application Ser. No. 12/201,062, filed Aug. 29, 2008, issued as U.S. Pat. No. 8,025,257 on Sep. 27, 2011 and which is a U.S. Utility application of U.S. Provisional Application Ser. No. 60/992,746, filed Dec. 6, 2007 and to which priority benefit under 35 U.S.C. §119(e) is claimed, and all of which are hereby incorporated by reference in their entirety.

FIELD OF THE INVENTION

The present invention relates generally to a bearing installed on an aircraft structure. In particular, the present invention relates to an hourglass bearing in a drop linkage assembly of a trailing edge flap arrangement of an aircraft, for example an Airbus A-350 aircraft. The present invention further relates to corrosion resistant nitrogen (CREN) bearing materials and more specifically to a bearing made from XD15NW® (XD15NW is a registered trademark of AUBERT & DUVAL COMPANY, FRANCE) (AMS 5920), Cronidur 30® (CRONIDUR is a registered trademark of Energietechnik Essen GmbH, GERMANY) (AMS 5925), or 422 stainless (AMS 5655), a composite seal, a cage for an hourglass bearing and an hourglass roller profile, and to corrosion resistant steel (CRES) bearing materials and more specifically to a bearing made from 440C stainless steel (AMS5630, AMS 5618, AMS 5880), a composite seal, a cage for an hourglass bearing and an hourglass roller profile.

BACKGROUND OF THE INVENTION

There are many types of bearings that are used in various applications. Such bearings include journal bearings, roller bearings, spherical bearings and hourglass type bearings. In general, these bearings have an inner race that is disposed at least partially in an outer race. The inner race and outer race are movable relative to one another. There is an annular cavity between the inner race and the outer race that typically contains a lubricant. One well known problem with bearings is the ingress of debris and contaminants into the annular cavity which can cause premature failure of the bearings due to degradation of the lubrication. Moreover, operation of the bearing can cause the lubricant to inadvertently escape from the annular cavity.

In an effort to mitigate the aforementioned problems, seals have been positioned across the annular cavity to maintain the lubricant in the cavity and to prevent the ingress of debris into the annular cavity. However, during operation, such seals become dislodged from the bearing and fail to function. In addition, such seals have often been too flexible, thereby allowing the seal to glide over debris and sweep the debris into the annular cavity.

Referring to FIG. 8, typical hourglass roller bearings 500, include an inner member 510, for example a ball, surrounded by an outer member 512. A plurality of hourglass shaped rollers 515 are disposed between the inner member 510 and the outer member 512. The inner member 510 defines a radially outwardly facing convex bearing surface 520. The outer member 512 defines a first radially inwardly facing convex bearing surface 522A and a second radially inwardly facing convex bearing surface 522B. Each of the rollers 515 has a concave exterior surface 525 extending between axial end faces 525A and 525B of the roller 515.

When bearings are operated at high loads, the typical rollers 515 can experience a detrimental effect referred to as "end-stress." As shown in FIG. 9, each of the rollers 515 has an effective length LE that extends between axially outermost portions of two high stress zones 535A and 535B. The concave exterior surface 525 of the typical hourglass roller 515 has a constant radius of curvature RC over the entire effective length LE. As shown in FIG. 10, typically the peak surface stress 550P occurs in the high stress zones 535A and 535B. The peak surface stress 550P causes accelerated wear of: 1) the radially outwardly facing convex bearing surface 520; 2) the first radially inwardly facing convex bearing surface 522A; 3) the second radially inwardly facing convex bearing surface 522B; and 4) the concave exterior surface 525 of the roller 515.

For example, FIG. 11 illustrates the outer member 512 having a line of surface distress 555 extending circumferential around a portion of the first radially inwardly facing convex bearing surface 522A, shown after testing (but before spalling) with a prior art hourglass shaped roller 515. FIGS. 12 and 13 illustrate the inner member 510 having lines of surface distress 555A, 555B, 555C and 555D at four locations where the high stress zones 535A and 535B of the prior art roller 515 contact the inner member 510, shown after testing (but before spalling). FIG. 14 illustrates additional wear in the form of spalling 566 on the radially outwardly facing convex bearing surface 520 of the inner member 510. FIG. 15 illustrates the prior art roller 515 having lines of burnished material 577 at an edge of the effective length LE that extends between the axially outermost portions of two high stress zones 535A and 535B.

Typical bearings include an inner member, for example a ball, surrounded by an outer member. A typical roller bearing includes a plurality of rollers disposed between the inner member and the outer member. A typical hourglass bearing includes a plurality of hourglass shaped rollers disposed between the inner member and the outer member. The inner member defines a radially outwardly facing convex bearing surface. The outer member defines a first radially inwardly facing convex bearing surface and a second radially inwardly facing convex bearing surface. Each of the rollers has a concave exterior surface extending between axial end faces and of the roller.

Corrosion is a major cause of bearing failure on aerospace structures. Corrosion can be due to moisture, salt spray, cleaning fluids, etc. There are several ways to prevent corrosion which include plating, such as Cadmium, on standard steel product, and the use of stainless steels. Stainless steels have differing corrosion resistance. CREN steels have much more corrosion protection than typical stainless steels used in bearings such as 440C (AMS 5630) Corrosion of the inner member, of the rollers and of the outer member impedes the ability of the bearing to function as intended. For example, a corroded bearing is less efficient than a bearing that has not undergone corrosion due to increased friction between contact surfaces as a result of said corrosion.

Bearings are typically used in aircraft wing flap arrangements. For example, U.S. Pat. No. 8,714,493 describes a trailing edge flap arrangement for an aircraft wing that includes a drop linkage arrangement that includes one or more bearings. The subject matter of U.S. Pat. No. 8,714,493 is incorporated by reference herein, in its entirety.

SUMMARY OF THE INVENTION

In one aspect, the present invention resides in an edge flap arrangement having a main flap element, an actuator, and a linkage arrangement. The actuator moves the main flap element relative to the aircraft wing. The linkage arrangement supports the main flap from the aircraft wing for movement relative to the aircraft wing. The linkage arrangement includes a fixed strut secured to the aircraft wing and a drop link secured to the main flap element. The fixed strut and the drop link are pivotally connected by a hinge point. One or more first hourglass bearings are disposed in one or more of the hinge points and the actuators.

The first hourglass bearing includes an inner member, an outer member, one or more hourglass rollers, and a cage. The inner member defines an inner raceway. The inner raceway has a radially outwardly facing convex surface having an inner raceway radius of curvature. The outer member defines an outer raceway. The outer raceway has a radially inward facing convex inner surface having an outer raceway radius of curvature. The outer raceway is positioned around the inner raceway.

The hourglass rollers are disposed between the inner member and the outer member and are in rolling engagement with the inner raceway and the outer raceway. The hourglass rollers have a circular cross section that is symmetrical about a longitudinal axis. The hourglass rollers have a first axial end and a second axial end, and an axial width that extends between the first axial end and the second axial end. The hourglass rollers include an exterior surface that extends between the first axial end and the second axial end. The exterior surface defines a concave engagement surface that extends outwardly from a central portion of the roller. The concave engagement surface has a first radius of curvature R1 that extends from the central point to each of two first transition zones positioned on opposing sides of the central portion. The concave engagement surface has a second radius of curvature that extends outwardly from each of the two first transition zones to each of two second transition zones. The second radius of curvature is greater than the first radius of curvature. One or more of the outer member, the inner member, and the hourglass rollers are fabricated from CREN, Cronidur 30, XD15NW, and 422 stainless steel.

An annular seal assembly is snap-fit into the outer race. The annular seal assembly includes a first annular retaining ring, a second annular retaining ring, and a resilient ring. The first annular retaining ring defines a first radially outermost portion. The second annular retaining ring defines a second radially outermost portion. The resilient ring defines a third radially outermost portion. The resilient ring is disposed between the first annular retaining ring and the second annular retaining ring. The first radially outermost portion, the second radially outermost portion, and the third radially outermost portion are aligned with one another. The resilient ring projects radially inward from the first annular retaining ring and the second annular retaining ring. The resilient ring is more compressible and flexible than the first annular retaining ring.

The cage is disposed between the inner raceway and the outer raceway. The cage includes an annular ring that has a first axial face and a second axial face and a plurality of second rails that extend the length from the second axial face. The length is of a greater magnitude than that of the axial width of the hour glass rollers. The cage further includes a plurality of pockets. Each of the plurality of pockets is defined by opposing circumferentially facing walls of at least one of adjacent pairs of the first rails and adjacent pairs of the second rails. The circumferentially facing walls are concavely formed so that each of the plurality of pockets is cylindrical.

In another aspect, the present invention resides in an edge flap arrangement having a main flap element, an actuator, and a linkage arrangement. The actuator moves the main flap element relative to the aircraft wing. The linkage arrangement supports the main flap from the aircraft wing for movement relative to the aircraft wing. The linkage arrangement includes a fixed strut secured to the aircraft wing and a drop link secured to the main flap element. The fixed strut and the drop link are pivotally connected by a hinge point. One or more first hourglass bearings are disposed in one or more of the hinge points and the actuators.

The first hourglass bearing includes an inner member, an outer member, one or more hourglass rollers, and a cage. The inner member defines an inner raceway. The inner raceway has a radially outwardly facing convex surface having an inner raceway radius of curvature. The outer member defines an outer raceway. The outer raceway has a radially inward facing convex inner surface having an outer raceway radius of curvature. The outer raceway is positioned around the inner raceway.

The hourglass rollers are disposed between the inner member and the outer member and are in rolling engagement with the inner raceway and the outer raceway. The hourglass rollers have a circular cross section that is symmetrical about a longitudinal axis. The hourglass rollers have a first axial end and a second axial end, and an axial width that extends between the first axial end and the second axial end. The hourglass rollers include an exterior surface that extends between the first axial end and the second axial end. The exterior surface defines a concave engagement surface that extends outwardly from a central portion of the roller. The concave engagement surface has a first radius of curvature R1 that extends from the central point to each of two first transition zones positioned on opposing sides of the central portion. The concave engagement surface has a second radius of curvature that extends outwardly from each of the two first transition zones to each of two second transition zones. The second radius of curvature is greater than the first radius of curvature. One or more of the outer member, the inner member, and the hourglass rollers are fabricated from CRES and/or 440C stainless steel.

An annular seal assembly is snap-fit into the outer race. The annular seal assembly includes a first annular retaining ring, a second annular retaining ring, and a resilient ring. The first annular retaining ring defines a first radially outermost portion. The second annular retaining ring defines a second radially outermost portion. The resilient ring defines a third radially outermost portion. The resilient ring is disposed between the first annular retaining ring and the second annular retaining ring. The first radially outermost portion, the second radially outermost portion, and the third radially outermost portion are aligned with one another. The resilient ring projects radially inward from the first annular retaining ring and the second annular retaining ring. The resilient ring is more compressible and flexible than the first annular retaining ring.

The cage is disposed between the inner raceway and the outer raceway. The cage includes an annular ring that has a first axial face and a second axial face and a plurality of second rails that extend the length from the second axial face. The length is of a greater magnitude than that of the axial width of the hour glass rollers. The cage further includes a plurality of pockets. Each of the plurality of pockets is defined by opposing circumferentially facing walls of at least one of adjacent pairs of the first rails and adjacent pairs of the second rails. The circumferentially facing walls are concavely formed so that each of the plurality of pockets is cylindrical.

DETAILED DESCRIPTION OF THE INVENTION

Figure 1:
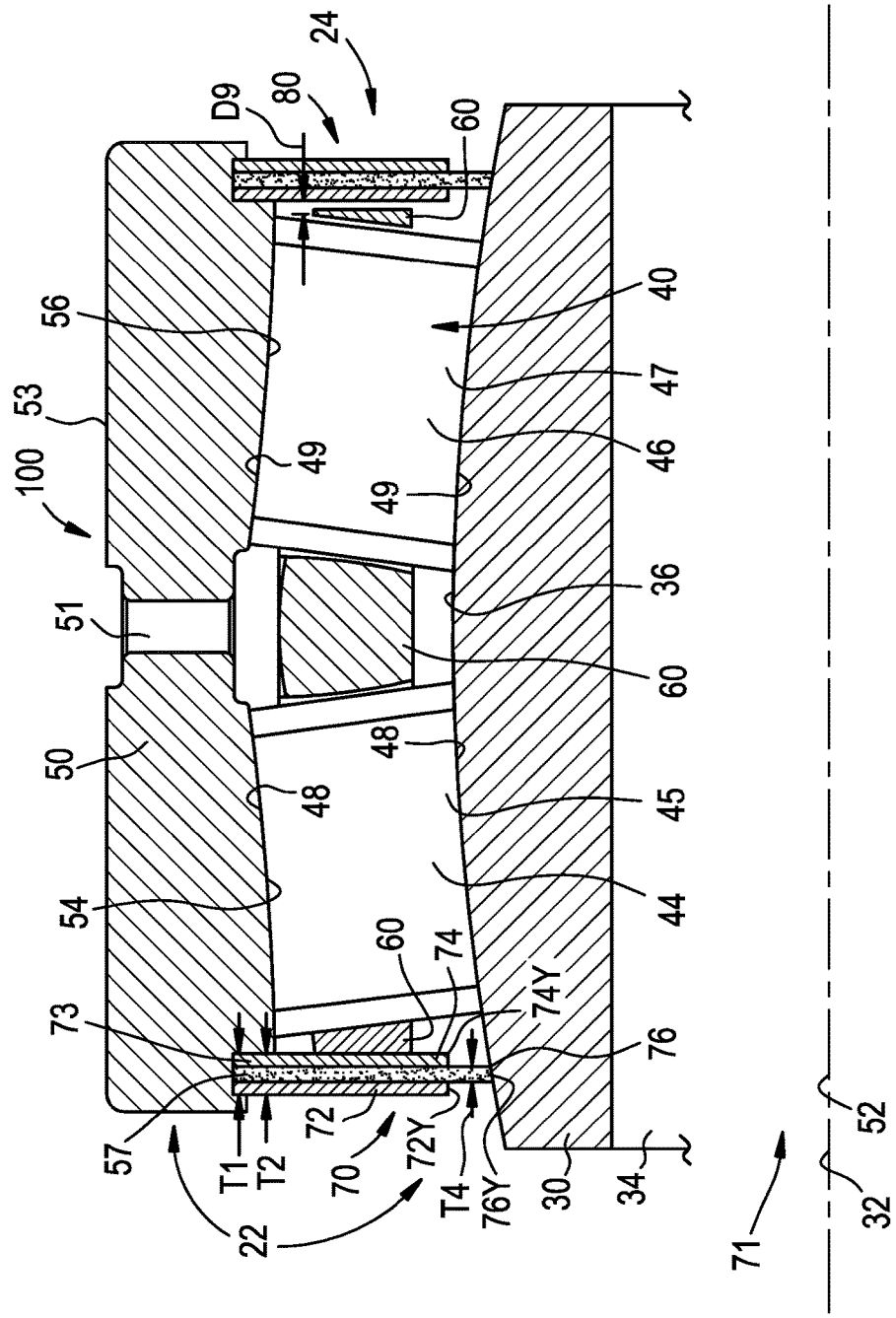
FIG. 1 is a cross-sectional view of a portion of a bearing in accordance with one embodiment of the present invention.

In reference to FIG. 1, a roller bearing apparatus 100 in accordance with the present invention is shown. In the embodiment illustrated in FIG. 1, the bearing 100 is an angular contact self-aligning bearing having hourglass type rollers 45, 47 as described herein. The bearing 100 has a composite annular seal assembly 70 (e.g., a sandwich seal) positioned on opposing ends thereof, as described further herein. The composite annular seal assembly 70 inhibits the ingress of contaminants into internal areas of the bearing 100 and egress of lubricant therefrom, as described herein. While the angular contact self-aligning bearing having hourglass type rollers is shown and described, the present invention is not limited in this regard as the composite annular seal assembly 70 may be employed with any type of bearing including but not limited to rolling bearings having balls and/or rollers, spherical plain bearings and journal bearings.

As shown in FIG. 1, the bearing 100 includes an inner race 30 and an outer race 50. The inner race 30 includes an inner race surface 36. The inner race surface 36 is generally convex. The inner race 30 defines a bore 34 extending therethrough. In some embodiments, the bore 34 may be coaxial with a central axis 32 of the inner race 30. In other embodiments, the bore 34 may be parallel to and radially displaced from the central axis 32 of the inner race 30, i.e. eccentric. A shaft (not shown) may be received in the bore 34. The shaft may be fixed about the central axis 32 relative to the inner race 30 by, for example, an interference fit between the shaft and the bore 34. It should be understood that although an interference fit is described in reference to the embodiment shown in FIG. 1, the present invention is not limited in this regard and the shaft may be fixed relative to the bore 34 of the inner race 30 using other known techniques, including, for example, welding, thermal installation, pinning, or by providing a bore and shaft with similarly shaped angular cross-sections to inhibit rotation slippage. In yet other embodiments, the inner race 30 and the shaft are the same component. In yet other embodiments, the shaft may be rotatable relative to the inner race 30.

The outer race 50 is annular about a central axis 52 of the outer race 50. The central axis 52 is coaxial with the central axis 32 of the inner race 30 when the bearing is aligned. It should be understood that the central axis 32 of the inner race 30 and the central axis 52 of the outer race 50 may be parallel and laterally displaced, for example, when the bearing 100 is subject to a radial force.

In the embodiment illustrated in FIG. 1, the outer race 50 defines a first outer race surface 54 and a second outer race surface 56, and each of the first and second outer race surfaces 54, 56 is generally opposite the inner race surface 36. Each of the first and second outer race surfaces 54, 56 is generally convex. The first outer race surface 54 and the inner race surface 36 define a first raceway 44 and the second outer race surface 56 and the inner race surface 36 define a second raceway 46. While the first and second outer race surfaces 54, 56 are shown and described as being generally convex, the present invention is not limited in this regard as in embodiment a journal bearing has a concave race surface of the outer race and has a pin with a convex outer race surface.

As illustrated in FIG. 1, the bearing 100 also comprises a plurality of first rollers 45 disposed in the first raceway 44, and a plurality of second rollers 47 disposed in the second raceway 46. Each of the plurality of first rollers 45 defines a first concave outer surface 48 that generally conforms to the convex surfaces of the inner race surface 36 and the first outer race surface 54. Each of the plurality of second rollers 47 defines a second concave outer surface 49 that generally conforms to the convex surfaces of the inner race surface 36 and the second outer race surface 56. This type of roller 45, 47 is generally referred to as an hourglass roller because of its generally concave surface extending between its ends. The bearing 100 further includes a cage 60 disposed between the inner race 30 and the outer race 50. The rollers 45, 47 and the cage 60 facilitate rotation of the outer race 50 relative to the inner race 30. The cage 60 also facilitates precessing of the rollers 45, 47 so that each of the rollers 45, 47 cycle through a load zone, even though the bearing 100 may be subject to an oscillatory rotation. Although a cage 60 is shown in the FIG. 1, the present invention is not limited in this regard and a person of ordinary skill in the art and familiar with this disclosure will understand that other known methods of precessing or indexing may be employed.

The outer race 50 defines a circumference 53 which includes a plurality of equally-spaced holes 51 therethrough for receiving a lubricant. The plurality of holes 51 provide fluid communication from an area outside the outer race 50 to a cavity 40 defined by the inner race 30 and outer race 50 and including the first raceway and the second raceway 44, 46. The plurality of holes 51 allow lubricant to be introduced and maintained in the first and second raceways 44, 46.

As shown in FIG. 1, the bearing 100 includes a first composite annular seal assembly 70 at or proximate to a first end 22 of the bearing 100 and a second composite annular seal assembly 80 at or proximate to a second end 24 of the bearing 100. The composite annular seal assemblies 70, 80 facilitate retention of lubricant in the first and second raceways 44, 46 and inhibit the ingress of contaminants into the first and second raceways 44, 46. The first composite annular seal assembly 70 extends from the first outer race surface 54 to the inner race surface 36; and the second composite annular seal assembly 80 extends from the second outer race surface 56 to the inner race surface 36. The composite annular seal assemblies 70, 80 are positioned axially adjacent to the cage 60. In one embodiment as shown with respect to the second composite annular seal assembly 80, the composite annular seal assembly 80 is positioned axially adjacent to the cage 60 and spaced apart therefrom by a distance 31 as shown in FIG. 1. In one embodiment, the composite annular seal assemblies 70, 80 define a substantially flat configuration and are positioned substantially parallel to one another. The disclosed hourglass roller bearing 100 may be subject to oscillatory rotation about its central axis 32, 52. In addition, the bearing 100 is angularly displaceable. For example, the central axis 52 of the outer race 50 may become angularly displaced from the central axis 32 of the inner race 30. To the extent the bearing 100 becomes angularly displaced as a result of an external force, the bearing 100 is configured to self-align. The inventors have discovered that bearing seals currently on the marketplace tend to dislodge or fail when such a bearing is subject to such angular displacement. The inventors have discovered that the composite annular seal assembly 70, 80 disclosed in the present application overcomes one or more of these problems associated with known seals, and is better capable of retaining its position when the bearing is subject to angular displacement.

Figure 2:
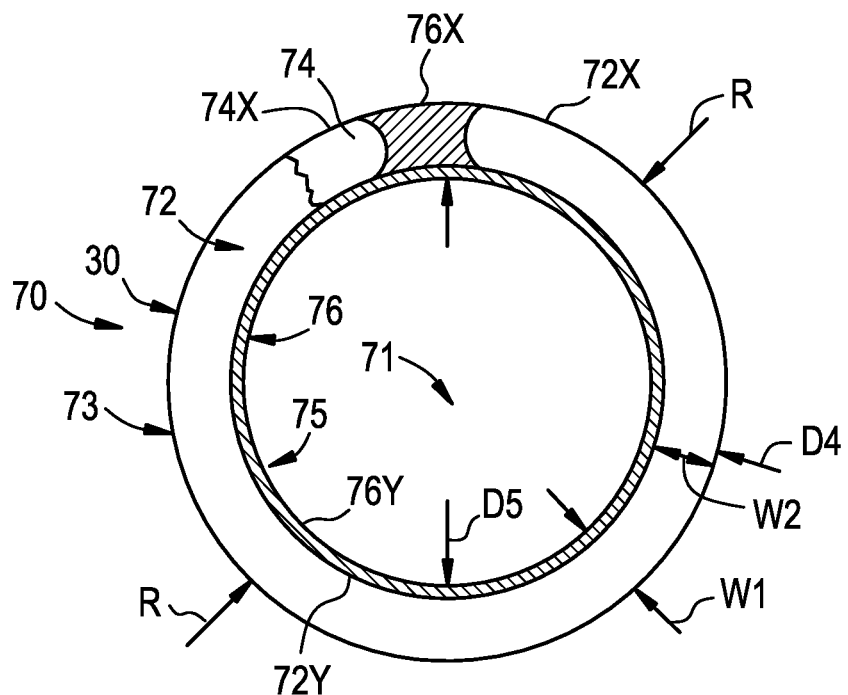
FIG. 2 is an edge view of a composite annular seal assembly for the bearing shown in FIG. 1.

As shown in FIG. 2, the first composite annular seal assembly 70 is generally annular and defines a bore 71 extending therethrough. At least a portion of the inner race 30 extends through the bore 71 as shown in FIG. 1. The first composite annular seal assembly 70 includes a first annular retaining ring 72 and a second annular retaining ring 74. The first and second annular retaining ring 72, 74 are generally annular, have a bore extending therethrough, and are often referred to as "seal caps."

Figure 3:
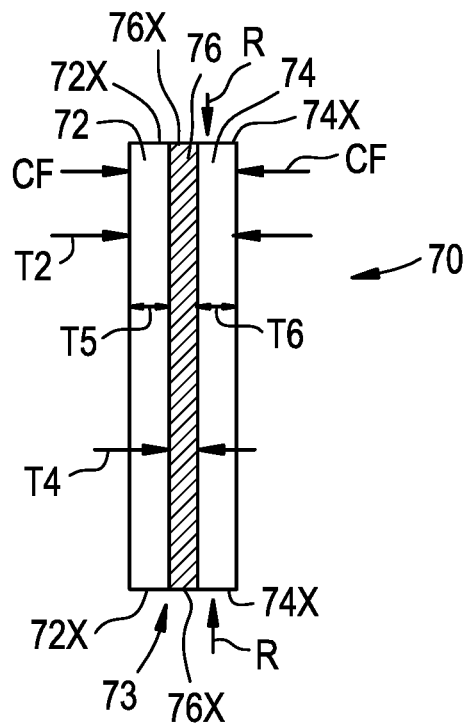
FIG. 3 is a side view of the composite annular seal assembly for the bearing shown in FIG. 1.
Figure 4:
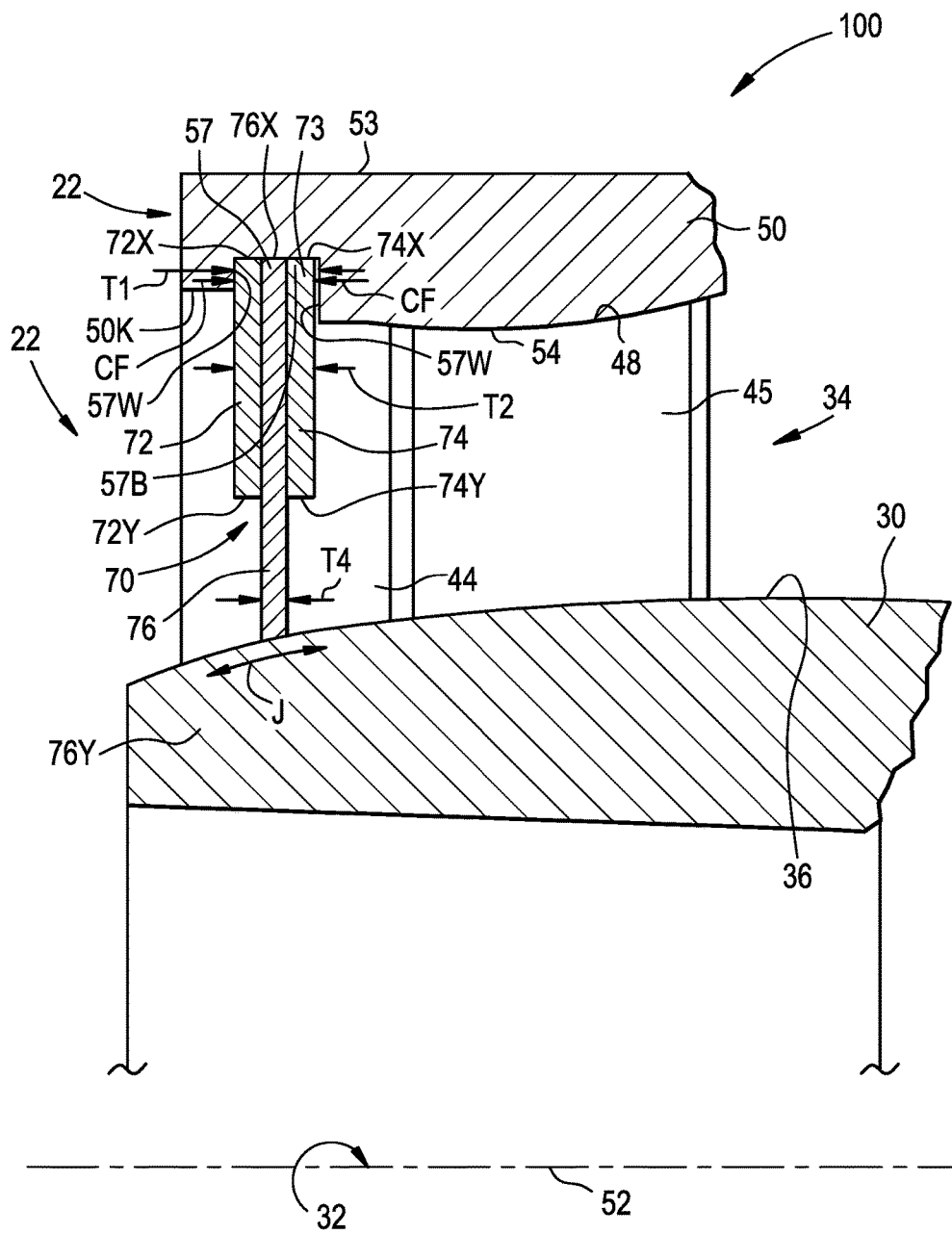
FIG. 4 is an enlarged view of a portion of the composite annular seal of FIG. 1.

Referring to FIGS. 1 and 3, the resilient ring 76 is disposed, i.e. sandwiched, between the first annular retaining ring 72 and the second annular retaining ring 74. In the front view of the composite annular seal 70 of FIG. 2 a portion of the first annular retaining ring 72 is shown cut away to illustrate the resilient ring 76 positioned thereunder. In FIG. 2, a portion of the resilient ring 76 is cut away to illustrate the second annular retaining ring 74 thereunder. As shown in FIGS. 2, 3, and 4, the composite annular seal assembly 70 defines an outer radial end 73 defined by a first radially outermost portion 72X of the first annular retaining ring 72, a second radially outermost portion 74X of the second annular retaining ring 72 and a third radially outermost portion 76X of the resilient ring 76. The first radially outermost portion 72X of the first annular retaining ring 72, the second radially outermost portion 74X of the second annular retaining ring 72 and the third radially outermost portion 76X are aligned with one another at the outer radial end 73.

As best shown in FIGS. 1, 2, and 4, the resilient ring 76 extends from the third radially outermost portion 76X radially inward to an inner radial end 76Y. The inner radial end 76Y is positioned radially inward from an inner radial end 72Y of the first annular retaining ring 72 and is positioned radially inward from an inner radial end 74Y of the second annular retaining ring 74. In one embodiment the resilient ring 76 has a width W1 and the first annular retaining ring 72 and the second annular retaining ring 74 each have a width W2. The width W2 is less than the width W1. In one embodiment, the width W2 is between about 70 percent and 90 percent of the width W1.

As shown in FIG. 1, the first end 73 of the composite annular seal assembly 70 is received in a radially inward facing groove 57 defined in the outer race 50 adjacent to or proximate the first outer race surface 54 and a lip 50K (see FIG. 4) located at the first end 22 of the bearing 100. In the embodiment shown in FIG. 1, the groove 57 defines a channel width T1. The groove is defined by opposing side walls 57W and a base 57B extending between the opposing side walls 57W, as shown in FIG. 4. As best shown in FIG. 3, the first end 73 of the composite annular seal assembly 70 defines a thickness T2, wherein T2 includes a thickness T5 of the first annular retaining ring 72, a thickness T6 of the second annular retaining ring 74 and a thickness T4 of the resilient ring 76. In one embodiment, T1 is greater than T2 to allow the first end 73 of the seal 70 to be snap-fit and retained in the groove 57 between the side walls 57W. The snap-fit is accomplished by laterally deflecting the composite annular seal 70 so that the first end 73 thereof is deflected radially inward to clear the lip 50KL and allow the first end 73 to snap into the groove 57, as described further herein with reference to FIG. 5.

While the composite annular seal assembly 70 is described as being seated and secured in the groove 57 using a snap-fit assembly, the present invention is not limited in this regard as other means for securing the composite annular seal assembly 70 in the groove 57, such as for example, installing the first end 73 of the composite annular seal assembly 70 in the groove 57 by using an adhesive, or some other known means, may be used without departing from the broader aspects of the invention.

The inner radial end 76Y of the resilient ring 76 slidingly engages (i.e., laterally and circumferentially) the inner race surface 36 of the inner race 30 adjacent to the first end 22 of the bearing 100 when the first composite annular seal assembly 70 is received in the groove 57 and the inner race 30 is disposed in the outer race 50. As described above, the first end 73 of the composite annular seal assembly 70 is received in the radial groove 57 defined in the outer race 50. As a result, the resilient ring 76 and the first and second retainers 72, 74 are axially secured inside the groove 57. The composite annular seal assembly 70 exhibits a tolerance stack-up such that retention inside the groove 57 by additional means is not necessary. However, use of such additional means for axial retention of the resilient ring 76 and the first and second annular retaining rings 72, 74 inside the groove 57, such as use of adhesives, is considered within the scope of the invention. Similarly, the resilient ring 76 is retained between the first and second annular retaining ring 72 and 74 by the press fit inside the groove 57 such that additional means is not necessary. However, use of such additional means for retaining the resilient ring 76 between the first and second annular retaining ring 72 and 74, such as us of adhesives or mechanical fasteners, is considered within the scope of the invention.

The resilient ring 76 is more compressible and flexible than the first annular retaining ring 72 and the second annular retaining ring 74. For example, resilient ring 76 is made from polytetrafluoroethylene (PTFE) and the first annular retaining ring 72 and the second annular retaining ring 74 are metallic. In one embodiment the first annular retaining ring 72 and the second annular retaining ring 74 are manufactured from a metal sheet stock, for example, stainless steel sheet stock and plain carbon steel sheet stock. However, the present invention is not limited in this regard as any materials may be used for the resilient ring 76, the first annular retaining ring 72 and the second annular retaining ring 74 without departing from the broader aspects disclosed herein.

Depending on the size of the bearing 100, the thickness T4 of the resilient ring 76 is between about 0.010 inch and about 0.064 inch. In one embodiment, the thickness T5 of the first annular retaining ring 72 and the thickness T6 of the second annular retaining ring 74 are each about 0.008 inches to about 0.063 inches.

The second composite annular seal assembly 80 is similar in design and construction to the first composite annular seal assembly 70, and is therefore not described in detail herein.

Although the hourglass bearing is shown as having a first raceway 44 and a second raceway 46, the present invention is not limited in this regard, and the composite annular seal assembly in accordance with the present invention may by employed on an hourglass roller bearing having only a single row of rollers. It has been discovered that the benefit of the disclosed composite annular seal assembly design is that it facilitates the oscillatory movement of the bearing 100, while remaining stable and in position.

Figure 5:
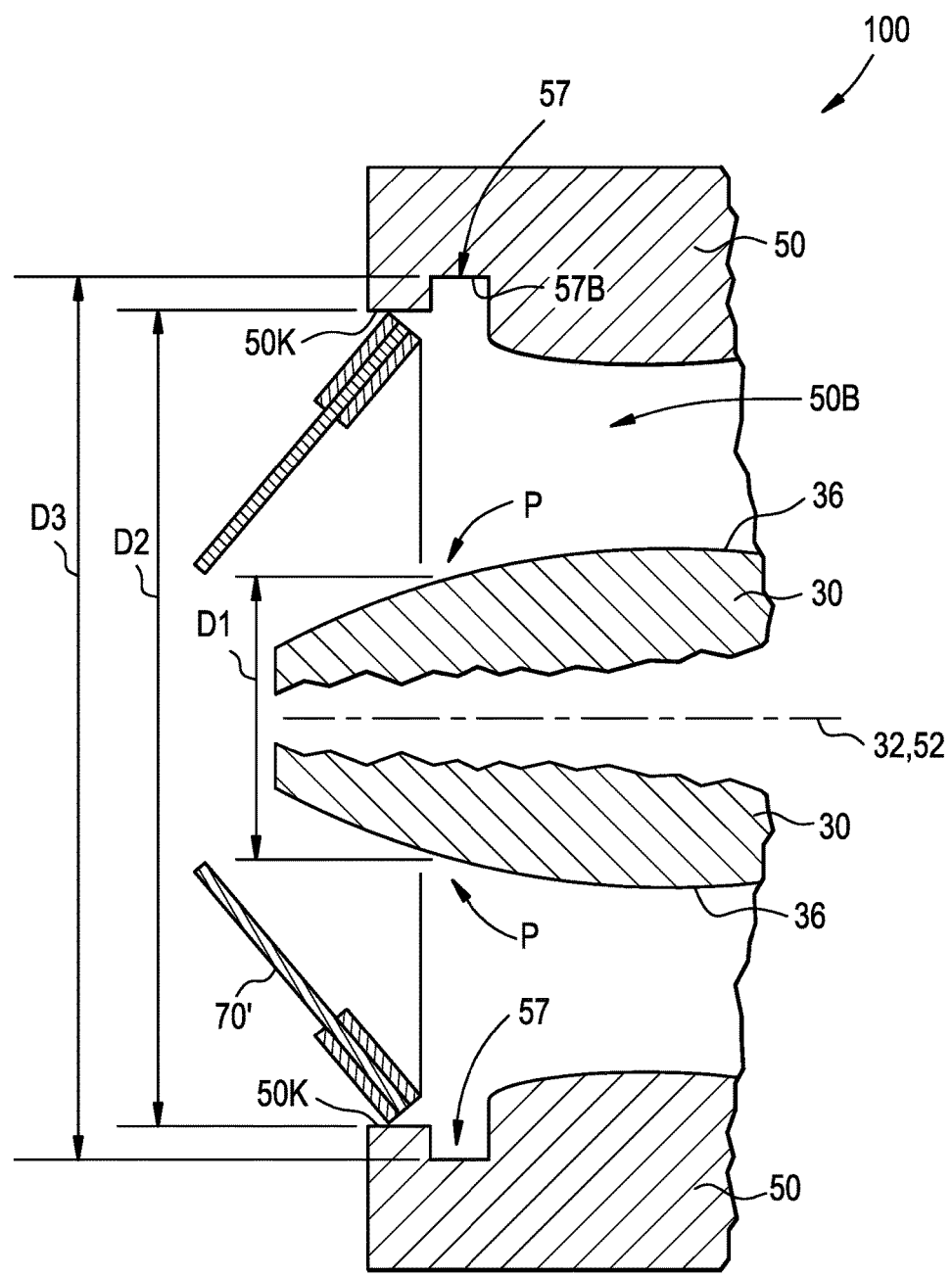
FIG. 5 is a cross sectional view of the bearing of FIG. 1 with the composite seal assembly shown in a laterally deflected state during installation into the bearing.

Referring to FIG. 5, the groove 57 has a diameter 25 measured between opposing base portions 57B. A diameter 23 is defined between points of contact P of the inner radial end 76Y of the resilient seal 76 with the inner race surface 36. The outer race 50 defines the lip 50K axially outward from the groove 57. The lip 50K defines a bore 50B having a diameter 24. As shown in FIG. 2, the composite annular seal assembly 70 has an outside diameter 26 and the resilient ring 76 has an inside diameter 27. In one embodiment, the diameter 24 of the bore 50B is less than the diameter 26 of the composite annular seal assembly 70 to allow the composite annular seal assembly 70 to be laterally elastically deformed, for example, by laterally deflecting the composite annular seal 70 into a deflected state as indicated by element number 70' in FIG. 5 so that the first end 73 thereof is deflected radially inward to clear the lip 50K and allow the first end 73 to be snap-fit into the groove 57.

Figure 6:
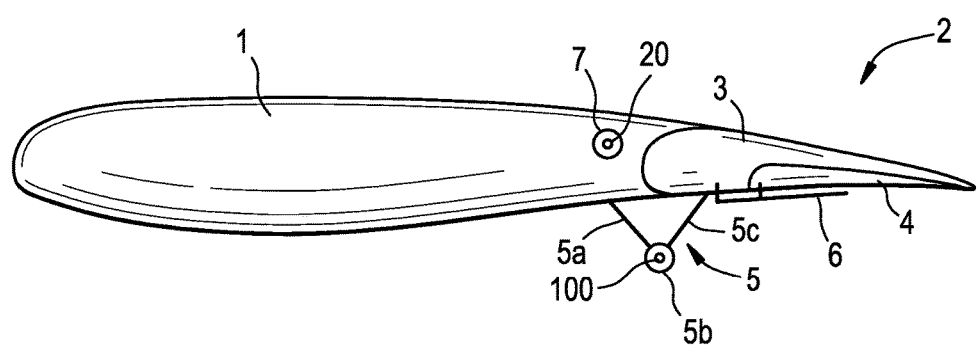
FIG. 6 illustrates schematically a cross section through an aircraft wing having a trailing edge flap arrangement in accordance with the invention shown in its retracted position.

Referring to FIG. 6, an aircraft wing includes a main fixed wing portion 1 and a single slotted trailing edge flap arrangement 2. The flap arrangement 2 includes a main element 3 and an auxiliary flap element 4 supported by the main flap element 3. The main flap element 3 is pivotally supported from the fixed wing portion 1 by a drop hinge linkage arrangement 5. The drop hinge linkage arrangement 5 includes a fixed strut 5a, a hinge point 5b and a drop link 5c. The fixed strut 5a is mounted to the fixed wing portion 1 and carries the hinge point 5b. The drop link 5c connects the main flap element 3 to the hinge point 5b. The auxiliary flap element 4 is supported by a rail 6 mounted to the main flap element 3. The auxiliary flap element 4 is slidably disposed upon the rail 6 for translational movement relative to the main flap element 3. The hinge point 5b has one of the bearings 100 (as described herein with reference to FIGS. 1-5) mounted therein. The bearing 100 includes the seal assembly 80 disposed therein as described herein with reference to FIGS. 1-5. While the hinge point 5b is described as having one of the bearings 100 therein, the present invention is not limited in this regard as any number of the bearings 100 may be employed in the hinge point 5b. In one embodiment, the hinge point 5b has two of the bearings 100 installed therein; and in another embodiment, the hinge point 5b has two of the bearings 100 installed therein wherein the bearings 100 comprise different sized bearings.

FIG. 6 shows the flap arrangement 2 in its retracted position. The main flap element 3 is stowed, tucked against the trailing edge of the fixed wing portion 1. The auxiliary flap element 4 is stowed in a forward position so as to be nested beneath the rear of the main flap element 3. When stowed, the auxiliary flap element 4 completes the aerofoil profile of the main flap element 3. The trailing edges of the main and auxiliary flap elements 3 and 4 are substantially coincident when the auxiliary flap element 4 is in its retracted, stowed position. As further shown in FIG. 6, the main flap element 3 includes an actuator 7 (e.g., a linear or a rotary actuator), which is connected by a linkage arrangement (not shown) to the main flap element 3. In one embodiment, the actuator 7 has one of the bearings 100 (as described herein with reference to FIGS. 1-5) disposed therein. While the actuator 7 is described as having one of the bearings 100 therein, the present invention is not limited in this regard as any number of the bearings 100 may be employed in the actuator 7. For example, two bearings 100 are employed in a linear actuator. The bearing 100 includes the seal assembly 80 disposed therein as described herein with reference to FIGS. 1-5. The actuator 7 provides for movement of the main flap element 3 relative to the fixed wing portion 1. In one embodiment, the actuator 7 provides for movement of the drop hinge linkage arrangement 5 which, in turn, provides for movement of the main flap element 3 relative to the fixed wing portion 1.

Figure 7:
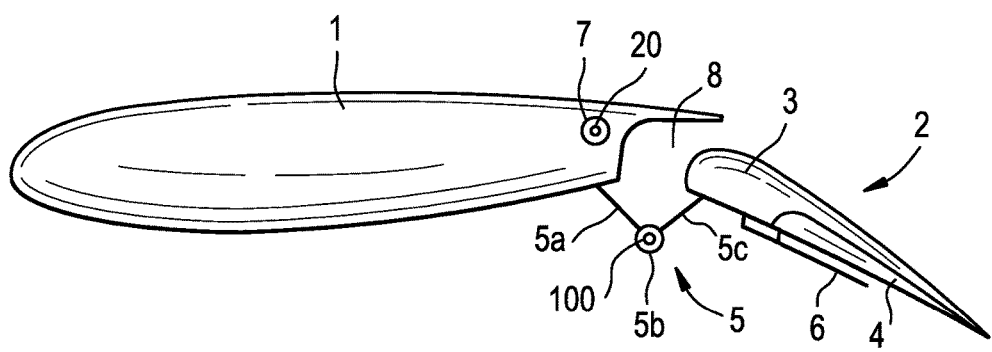
FIG. 7 illustrates the aircraft wing with the flap arrangement partially deployed.
Figure 8:
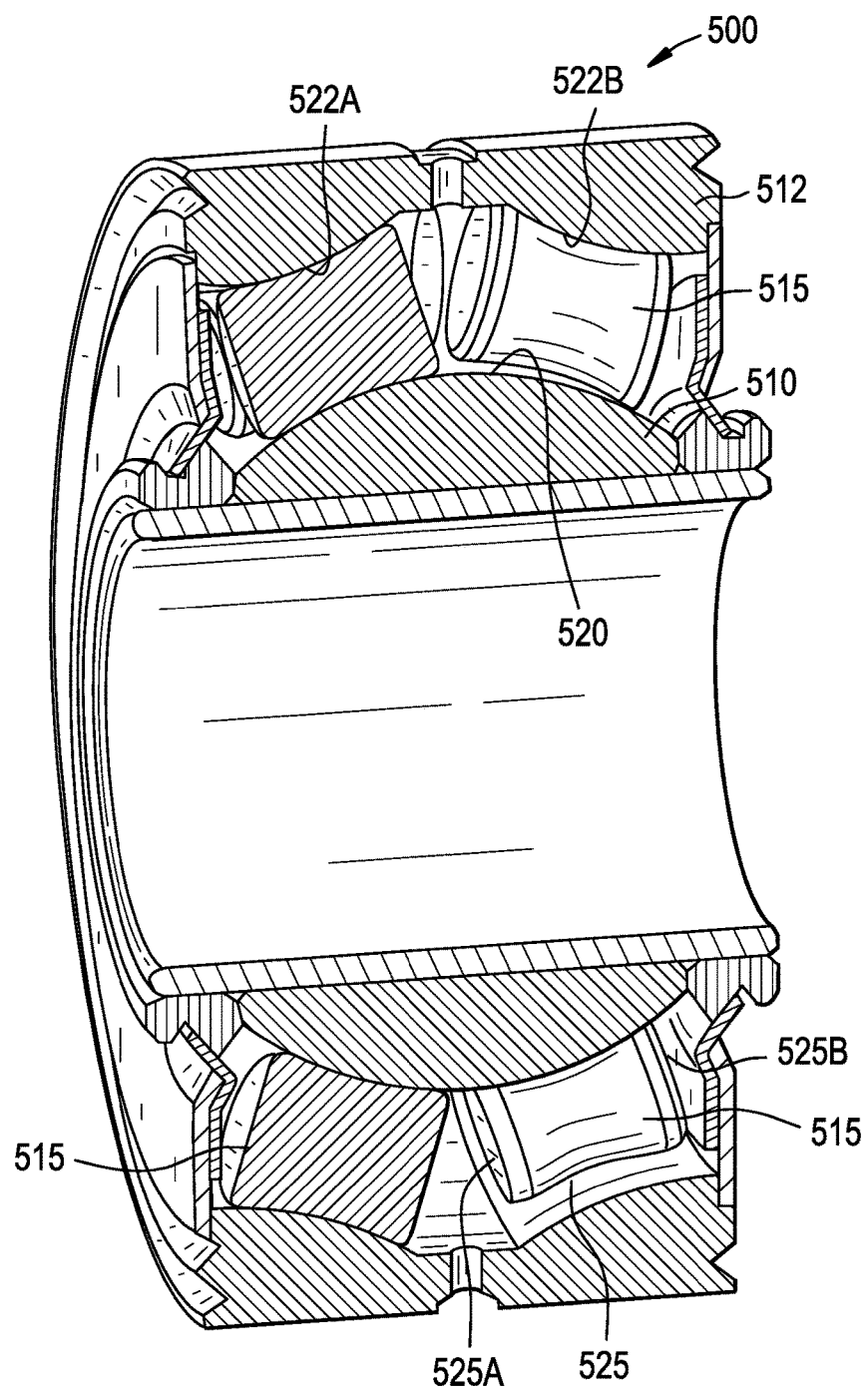
FIG. 8 is a perspective view of a cross section of a prior art hourglass bearing.
Figure 9:
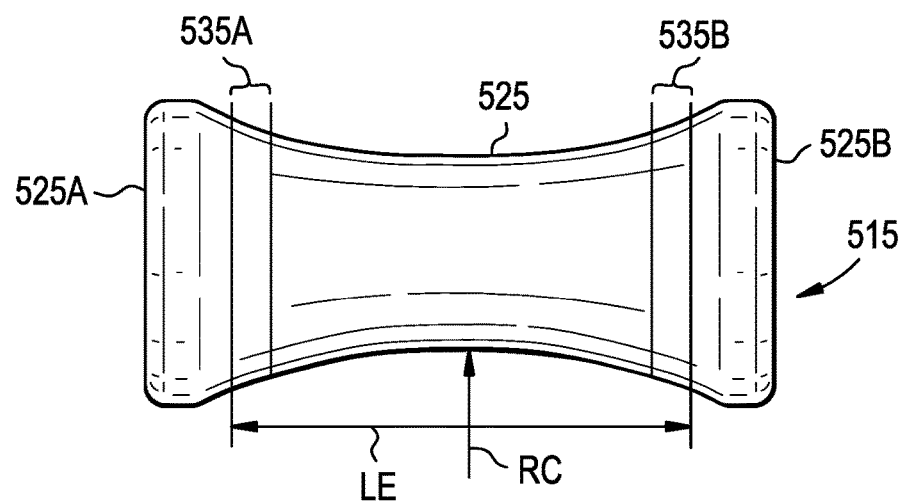
FIG. 9 is a front view of a prior art hourglass shaped roller.

FIG. 7 illustrates the flap arrangement 2 in its partially extended position. The main flap element 3 is deployed by rotating it downwardly using the drop hinge mechanism 5. Movement of the main flap element 3 is effected by the rotary actuator 7 and the bearing 100 installed therein. As can be seen from FIG. 7, the auxiliary flap element 4 can remain in its stowed, fully forward position as the main flap element 3 is deployed. In this partially extended configuration, the flap arrangement 2 functions substantially identically to a standard drop hinge flap arrangement. With the main flap element 3 extended by rotation about the drop hinge mechanism 5, a slot 8 is opened up between the fixed wing portion 1 and the main flap element 3. The single slotted flap configuration shown in FIG. 7 enables high pressure air from the lower wing surface to pass through the slot 8 to energize the boundary layer over the upper surface of the main flap element 3 so as to postpone stall in a conventional manner. The single slotted trailing edge flap arrangement 2 is configured for use with an aircraft such as, for example, an Airbus A-350 aircraft.

Figure 16:
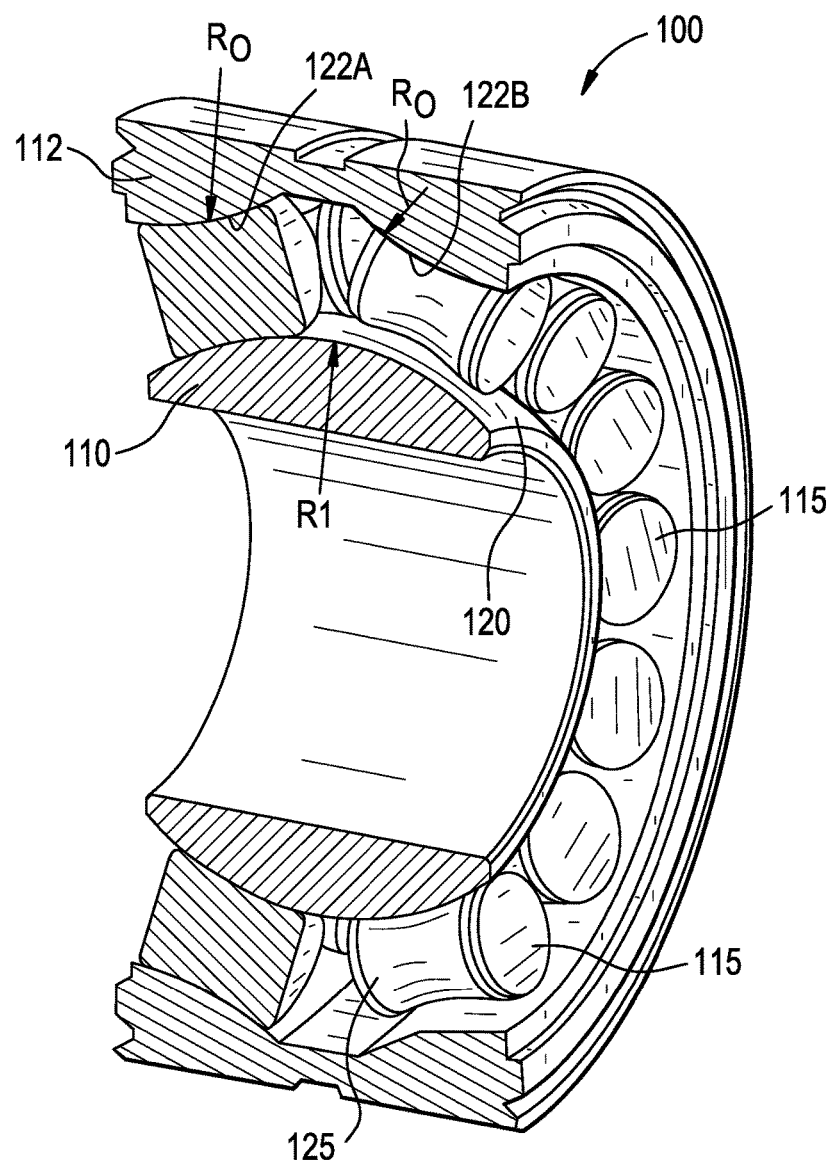
FIG. 16 is a perspective view of a cross section of an hourglass bearing having the rollers of the present invention.

As shown in FIG. 16, an hourglass bearing assembly is generally designated by the numeral 100. The hourglass bearing assembly 100 includes an inner raceway 110 defining a radially outwardly facing convex surface 120 having a radius of curvature R1. The hourglass bearing assembly 100 includes an outer raceway 112 defining a radially inward facing convex inner surface 122A and 122B, each having an outer raceway radius of curvature Ro. The outer raceway 112 is positioned around the inner raceway 110. A plurality of rollers 115 is disposed between the inner raceway 110 and the outer raceway 112 in two rows. Each of the plurality of rollers 115 has an hourglass shape. Each of the plurality of rollers 115 in one row is in rolling engagement with the radially outwardly facing convex surface 120 of the inner raceway 110 and the radially inward facing convex inner surface 122A of the outer raceway 112. Each of the plurality of rollers 115 in a second row is in rolling engagement with the radially outwardly facing convex surface 120 of the inner raceway 110 and the radially inward facing convex inner surface 122B of the outer raceway 112.

Figure 17:
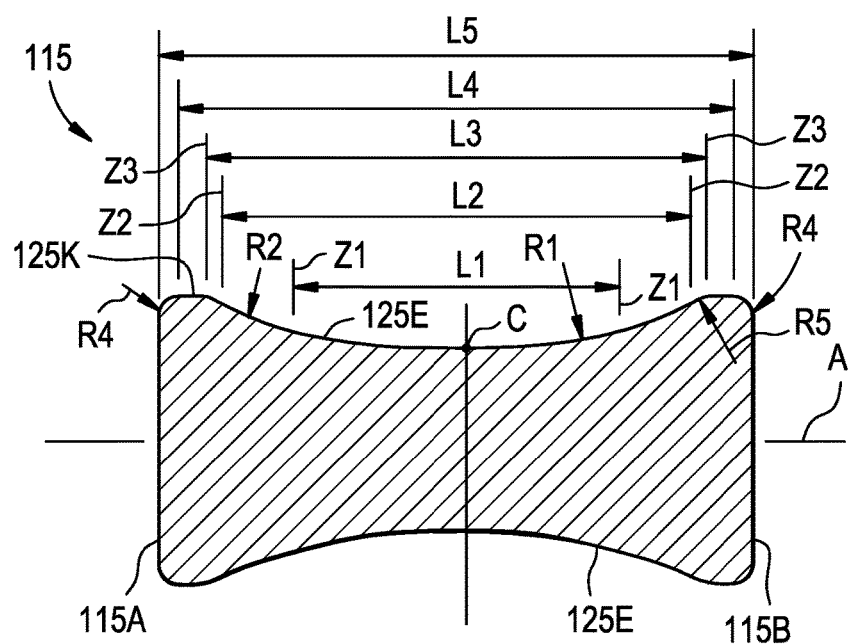
FIG. 17 is a cross sectional view of one of the rollers of the hourglass bearing of FIG. 16.
Figure 18:
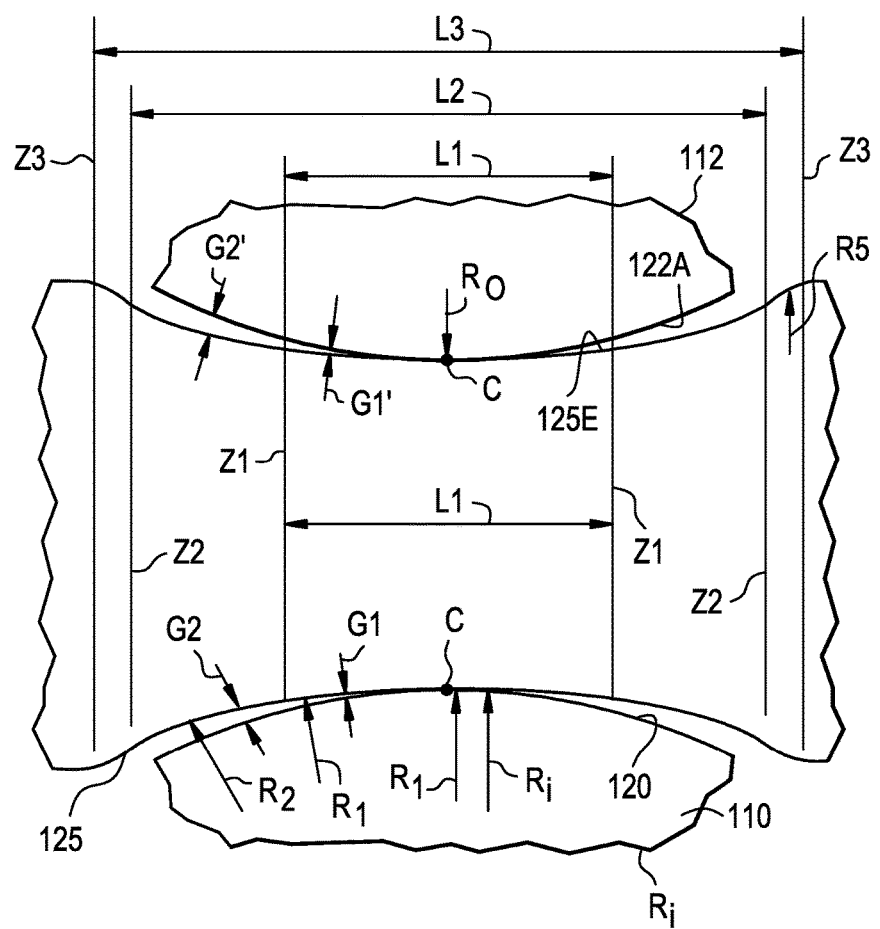
FIG. 18 is an enlarged cross sectional view of a portion of the roller of FIG. 17.

As shown in FIGS. 17 and 18, each of the plurality of rollers 115 has a circular cross section symmetrical about a longitudinal axis A. Each of the plurality of rollers 115 has a first axial end 115A and a second axial end 115B and an overall length of L5. A chamfer R4 exists at each of the first axial end 115A and second axial end 115B. Each of the plurality of rollers 115 has an exterior surface 125E extending between the first axial end 115A and the second axial end 115B. A portion of the exterior surface 125E between length L4 and L3 is cylindrical. The exterior surface 125E defines a concave engagement surface 125E extending outwardly from a central portion C of the roller 115. The concave engagement surface 125E has a first radius of curvature R1 extending from the central portion C to each of two first transition zones Z1 positioned on opposing sides of the central portion C. The two first transition zones Z1 are spaced apart from one another by a distance L1. The concave engagement surface 125E has a second radius of curvature R2 extending outwardly from each of the two first transition zones Z1 to each of two second transition zones Z2. The two second transition zones Z2 are spaced apart from one another by a distance L2.

As shown in FIGS. 17 and 18, the second radius of curvature R2 is greater than the first radius of curvature R1. In one embodiment, the first radius of curvature R1 is between 50 percent and 95 percent of the second radius of curvature R2. In one embodiment, the first radius of curvature R1 is between 70 percent and 92 percent of the second radius of curvature R2.

As shown in FIG. 18, the radius of curvature Ri of the inner raceway 110 is between about 95 percent and 100 percent of R1. In one embodiment, the radius of curvature Ri of the inner raceway 110 is between about 98 percent and 100 percent of R1. The radius of curvature Ro of the outer raceway 112 is between about 95 percent and 100 percent of R1. In one embodiment, the radius of curvature Ro of the outer raceway 112 is between about 98 percent and 100 percent of the radius of curvature R1.

Figure 20:
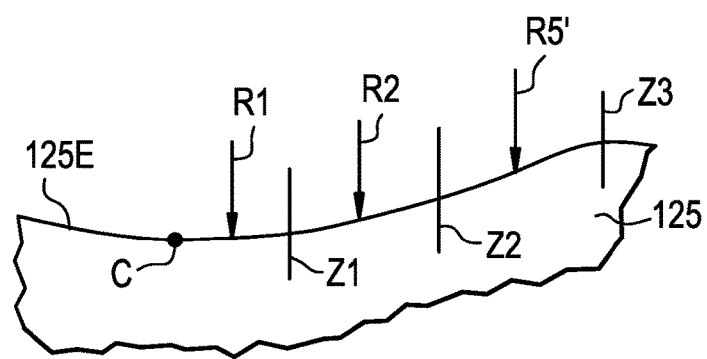
FIG. 20 is a schematic cross sectional view of a portion of the roller of FIG. 17.
Figure 21:
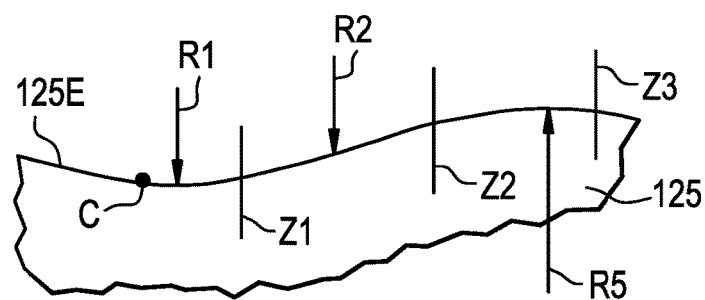
FIG. 21 is a schematic cross sectional view of a portion of one embodiment of a roller similar to that of FIG. 17.

The exterior surface 125E defines an extended area for engagement positioned between each of the second transition zones Z2 and each of two third transition zones Z3. The two third transition zones Z3 are positioned outwardly from a respective one of the second transition zones Z2. The two third transitions zones Z3 are spaced apart from one another by a distance L3. In one embodiment, the first distance L1 has a magnitude between 40 percent and 60 percent of the third distance L3. In one embodiment, the first distance L1 has a magnitude between 48 percent and 51 percent of the third distance L3. The area for engagement rollingly engages a rolling surface of a bearing race (e.g., the radially outwardly facing convex surface 120 of the inner raceway 110 and the radially inward facing convex inner surfaces 122A and 122B of the outer raceway 112) when the roller 115 and bearing race are in a loaded condition. As shown in FIGS. 17 and 21, in one embodiment, the exterior surface 125E transitions to a convex surface having a radius of curvature R5 positioned outwardly of the transition zone Z2. As shown in FIG. 20, in one embodiment, the exterior surface transitions to a concave surface having a radius of curvature R5' positioned outwardly of the transition zones Z2, and wherein the radius of curvature R5' is greater than R2. There exists a smooth transition at the first transition zones Z1, at the second transition zones Z2 and the third transition zones Z3.

As shown in FIG. 18, there is a gap G1 defined between the exterior surface of the rollers 115 and the radially outwardly facing convex surface 120 of the inner raceway 110. Another gap G1' is defined between the exterior surface of the rollers 115 and the radially inward facing convex inner surfaces 122A and 122B of the outer raceway 112. The gaps G1 and G1' are presented between the two first transition zones Z1 wherein the radius of curvature of the exterior surface is R1. The magnitude of the gaps G1 and G1' increase at a first rate from the central portion C, where the gaps G1 and G1' are zero, to the first transition zone Z1, since the R1 is greater than Ri and Ro, as discussed herein.

In addition, there is another gap G2 defined between the exterior surface of the rollers 115 and the radially outwardly facing convex surface 120 of the inner raceway 110. Another gap G2' is defined between the exterior surface of the rollers 115 and the radially inward facing convex inner surfaces 122A and 122B of the outer raceway 112. The gaps G2 and G2' are presented axially outward of the two first transition zones Z1 and axially inward of the two third transitions zones Z3. The magnitude of the gaps G2 and G2' increase at a second rate from the first transition zone Z1 to the second transition zone Z2, since the R2 is greater than R1 and R1 is greater than Ri and Ro, as discussed herein. The second rate of increase of the gaps G2 and G2' is greater than the first rate of increase of the gaps G1 and G1'.

As the rollers 115 are loaded there are elastic deformations of: (1) the exterior surface 125E of the rollers 115; (2) the radially outwardly facing convex surface 120 of the inner raceway 110; and (3) the radially inward facing convex inner surfaces 122A and 122B of the outer raceway 112. Thus, as the rollers 115 are loaded, the gaps G1, G1', G2 and G2' decrease to comport with the elastic deformations.

Figure 10:
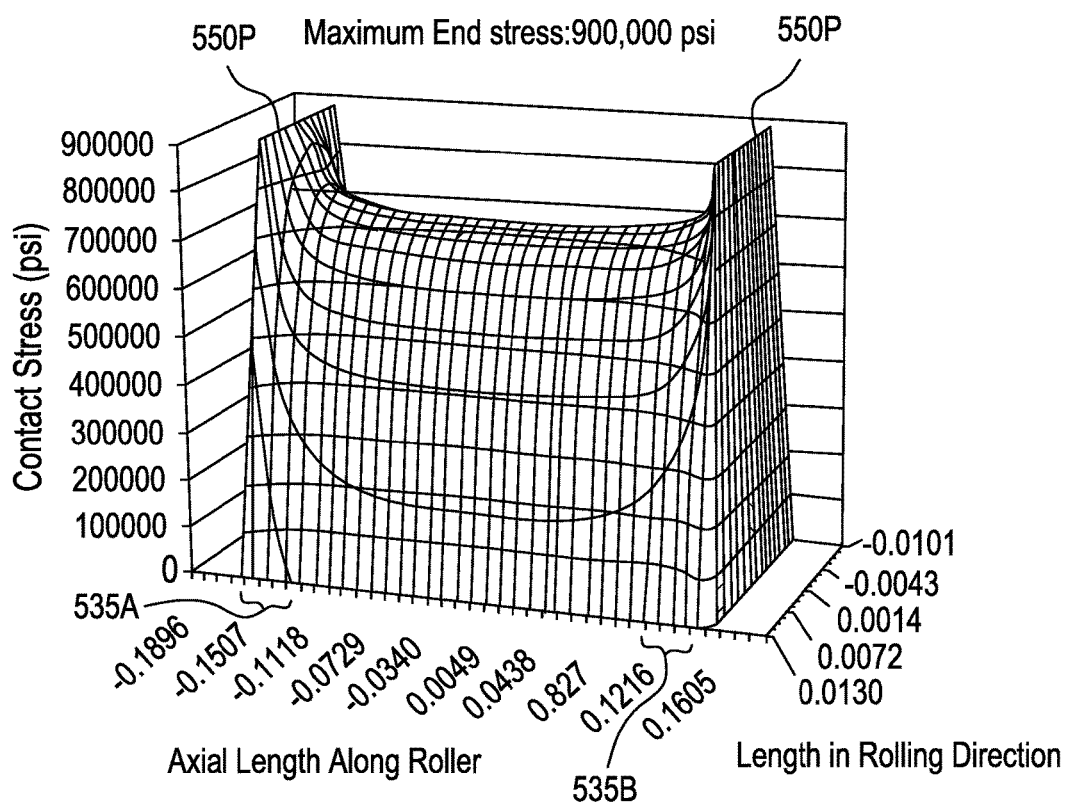
FIG. 10 is a three dimensional plot of surface stress versus axial length and circumferential length of a prior art hourglass shaped roller.
Figure 11:
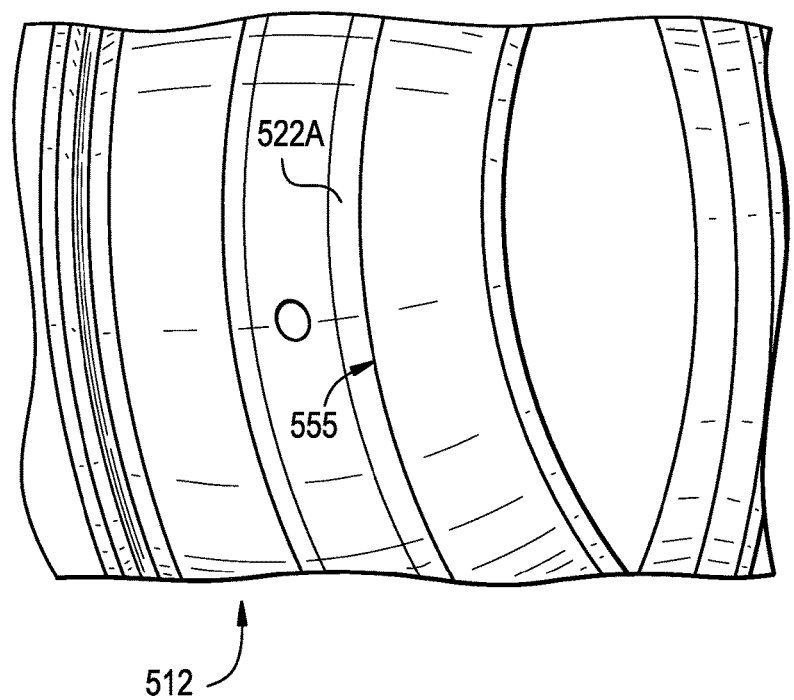
FIG. 11 is a photograph of an outer member after testing with a prior art hourglass shaped roller.
Figure 12:
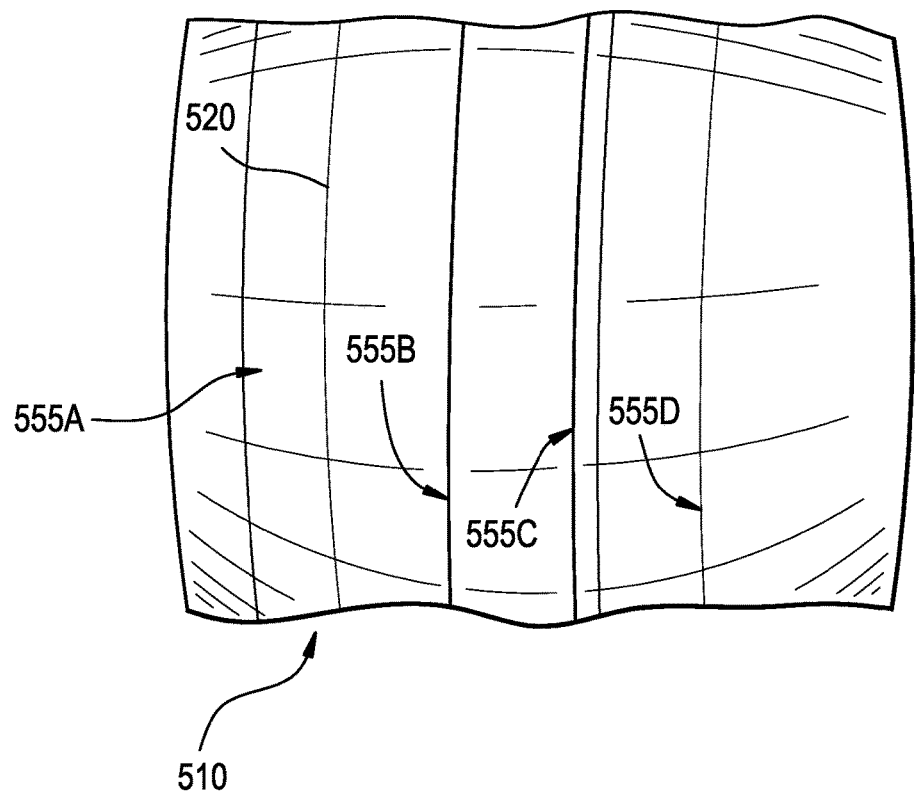
FIG. 12 is a photograph of an inner member after testing with a prior art hourglass shaped roller.
Figure 13:
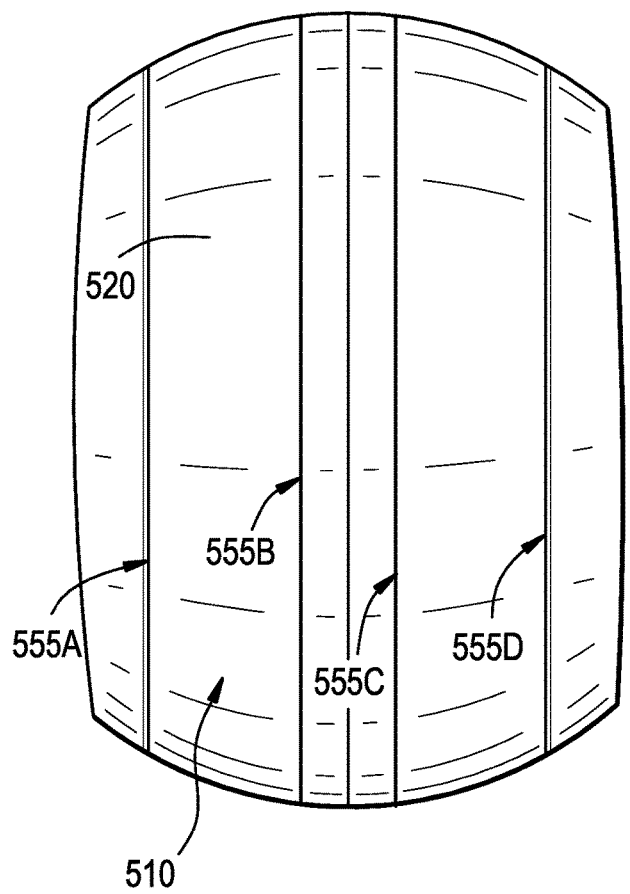
FIG. 13 is a photograph of an inner member after testing with a prior art hourglass shaped roller.
Figure 14:
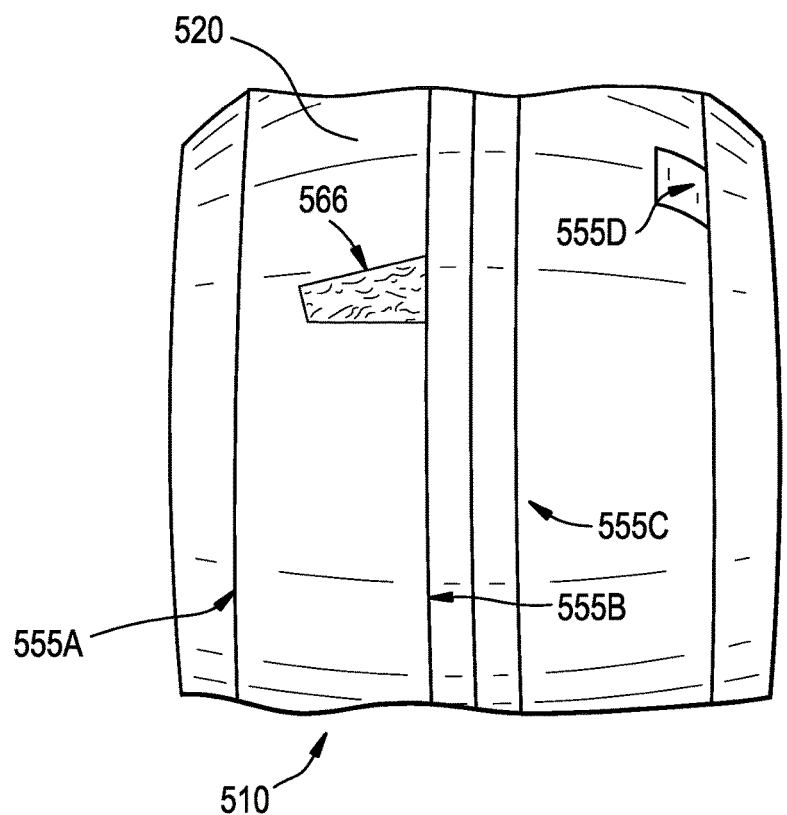
FIG. 14 is a photograph of an inner member after testing with a prior art hourglass shaped roller.
Figure 15:
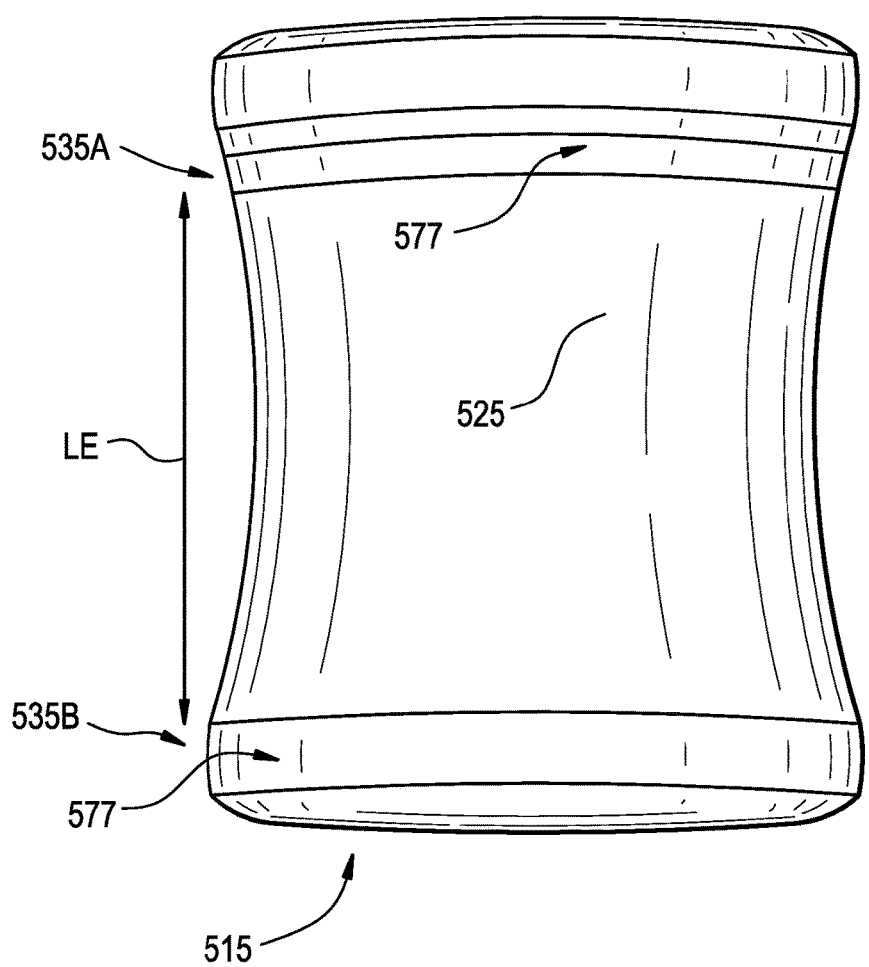
FIG. 15 is a photograph of a prior art hourglass shaped roller after testing.
Figure 19:
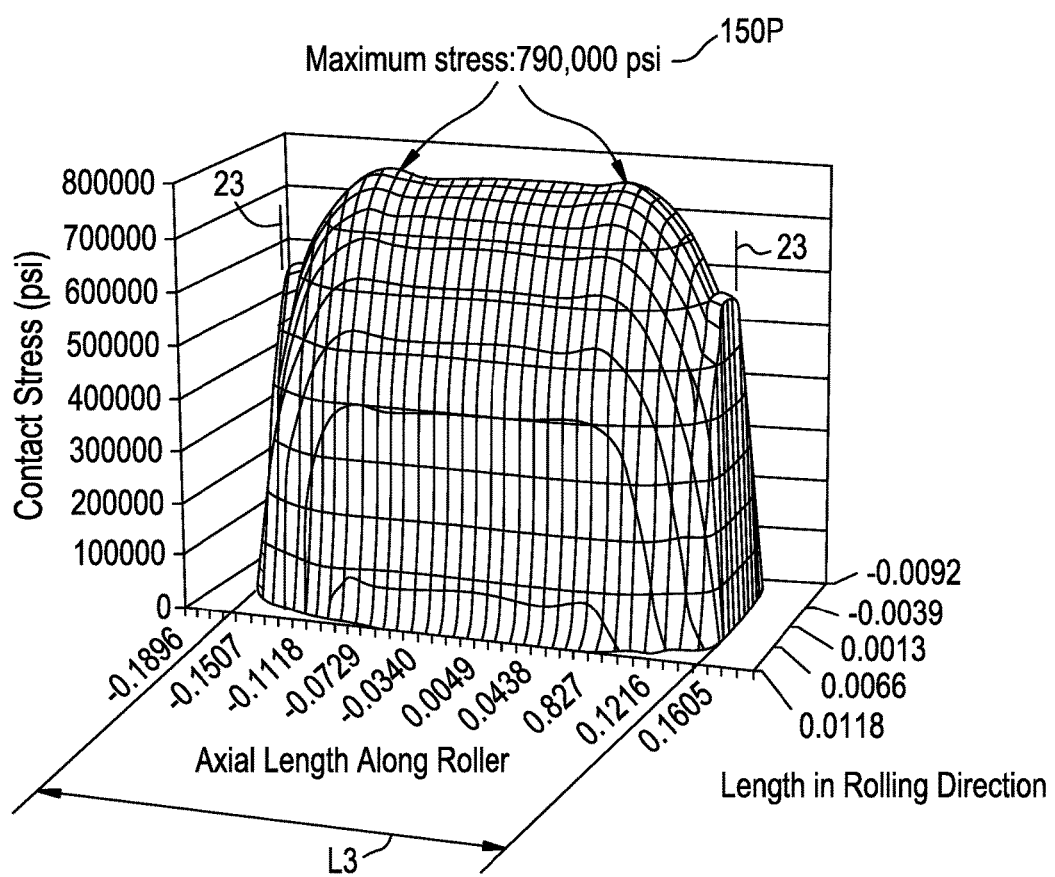
FIG. 19 is a three dimensional plot of surface stress versus axial length and circumferential length of the hourglass shaped roller of the present invention.

As shown in FIG. 19, the roller 115 has an improved stress profile compared to that shown in FIG. 10 for typical rollers 515. The stress profile for the roller 115 of FIG. 19 eliminates the peak "end stress" condition. For example, FIG. 19 illustrates that the peak stress 150P of the roller occurs inwardly of the third transition zone Z3. As a result of significant testing and analysis, the inventors have discovered that the roller 115 having the exterior surface 125E configured with the first radius of curvature R1 and the second radius of curvature R2 as described herein has resulted in the improved stress profile illustrated in FIG. 19.

Referring to FIGS. 6 and 7, an aircraft wing includes a main fixed wing portion 1 and a single slotted trailing edge flap arrangement 2. The flap arrangement 2 includes a main element 3 and an auxiliary flap element 4 supported by the main flap element 3. The main flap element 3 is pivotally supported from the fixed wing portion 1 by a drop hinge linkage arrangement 5. The drop hinge linkage arrangement 5 includes a fixed strut 5a, a hinge point 5b and a drop link 5c. The fixed strut 5a is mounted to the fixed wing portion 1 and carries the hinge point 5b. The drop link 5c connects the main flap element 3 to the hinge point 5b. The auxiliary flap element 4 is supported by a rail 6 mounted to the main flap element 3. The auxiliary flap element 4 is slidably disposed upon the rail 6 for translational movement relative to the main flap element 3. The hinge point 5b has one of the bearings 100 (as described herein with reference to FIGS. 16-B13) mounted therein. While the hinge point 5b is described as having one of the bearings 100 therein, the present invention is not limited in this regard as any number of the bearings 100 may be employed in the hinge point 5b. In one embodiment, the hinge point 5b has two of the bearings 100 installed therein; and in another embodiment, the hinge point 5b has two of the bearings 100 installed therein wherein the bearings 100 comprise different sized bearings.

Figure 22:
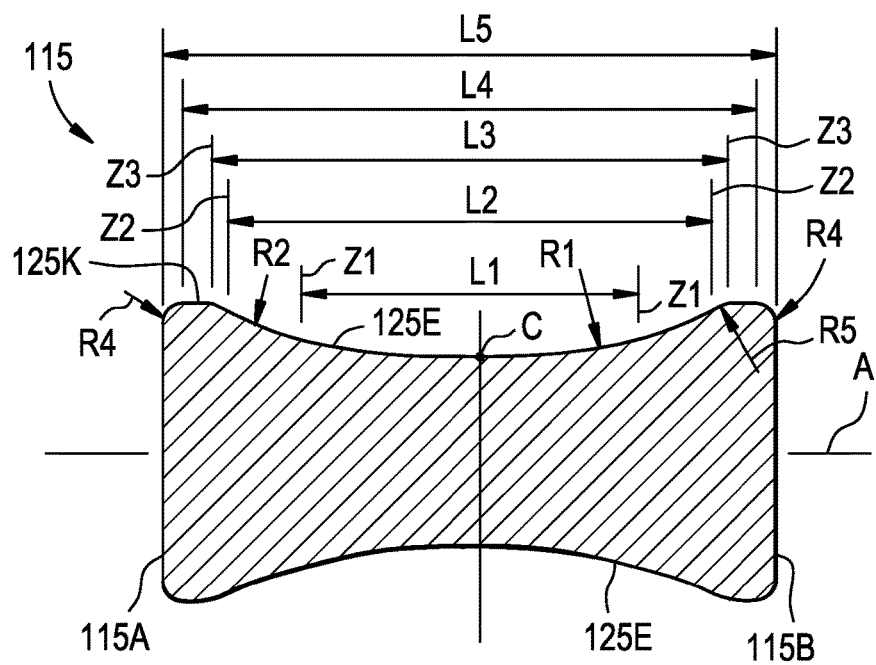
FIG. 22 is a cross sectional view of one of the rollers of the hourglass bearing of FIG. 16.
Figure 23:
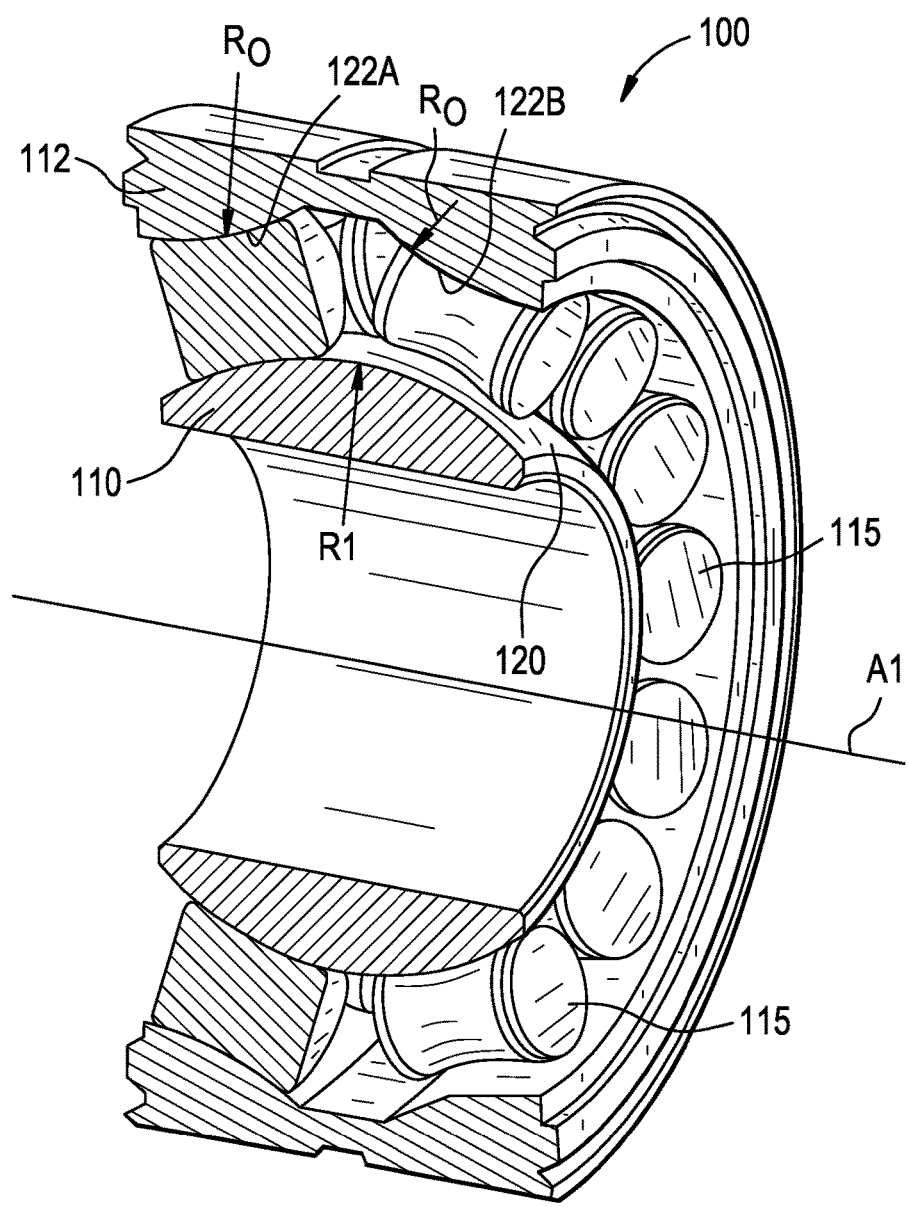
FIG. 23 is a perspective view of a cross section of an hourglass bearing having the cage of the present invention.

As shown in FIG. 22, each of the plurality of rollers 115 has a circular cross section symmetrical about a longitudinal axis A. Each of the plurality of rollers 115 has a first axial end 115A and a second axial end 115B and an overall length of L5. A chamfer R4 exists at each of the first axial end 115A and second axial end 115B. Each of the plurality of rollers 115 has an exterior surface 125E extending between the first axial end 115A and the second axial end 115B. A portion of the exterior surface 125E between length L4 and L3 is cylindrical. The exterior surface 125E defines a concave engagement surface 125E extending outwardly from a central portion C of the roller 115. The concave engagement surface 125E has a first radius of curvature R1 extending from the central portion C to each of two first transition zones Z1 positioned on opposing sides of the central portion C. The two first transition zones Z1 are spaced apart from one another by a distance L1. The concave engagement surface 125E has a second radius of curvature R2 extending outwardly from each of the two first transition zones Z1 to each of two second transition zones Z2. The two second transition zones Z2 are spaced part from one another by a distance L2.

As shown in FIG. 22, the second radius of curvature R2 is greater than the first radius of curvature R1. In one embodiment, the first radius of curvature R1 is between 50 percent and 95 percent of the second radius of curvature R2. In one embodiment, the first radius of curvature R1 is between 70 percent and 92 percent of the second radius of curvature R2.

In one embodiment, the rollers 115 are manufactured from CREN material. In one embodiment, CREN material for the rollers 115 is manufactured from Cronidur 30®. In one embodiment, CREN material for the rollers 115 is manufactured from XD15NW®. In one embodiment, the rollers 115 are manufactured from 422 Stainless Steel.

In one embodiment, the rollers 115 are manufactured from CRES material. In one embodiment, CRES material for the rollers 115 is manufactured from 440C stainless steel. In one embodiment, the 440C stainless steel is AMS5630. In one embodiment, the 440C stainless steel is AMS 5618. In one embodiment, the 440C stainless steel is AMS 5880.

In one embodiment, the inner raceway 110 is manufactured from CREN material. In one embodiment, CREN material for the inner raceway 110 is manufactured from Cronidur 30®. In one embodiment, CREN material for the inner raceway 110 is manufactured from XD15NW®. In one embodiment, the inner raceway 110 is manufactured from 422 Stainless Steel.

In one embodiment, the inner raceway 110 is manufactured from CRES material. In one embodiment, CRES material for the inner raceway 110 is manufactured from 440C stainless steel. In one embodiment, the 440C stainless steel is AMS5630. In one embodiment, the 440C stainless steel is AMS 5618. In one embodiment, the 440C stainless steel is AMS 5880.

In one embodiment, the outer raceway 112 is manufactured from CREN material. In one embodiment, CREN material for the outer raceway 112 is manufactured from Cronidur 30®. In one embodiment, CREN material for the outer raceway 112 is manufactured from XD15NW®. In one embodiment, the outer raceway 112 is manufactured from 422 Stainless Steel.

In one embodiment, the outer raceway 112 is manufactured from CRES material. In one embodiment, CRES material for the outer raceway 112 is manufactured from 440C stainless steel. In one embodiment, the 440C stainless steel is AMS5630. In one embodiment, the 440C stainless steel is AMS 5618. In one embodiment, the 440C stainless steel is AMS 5880.

XD15NW® includes between 0.37 and 0.45 percent by weight carbon, up to 0.60 percent by weight silicon, up to 0.60 percent by weight manganese, between 15.00 and 16.5 percent by weight chromium, between 1.50 and 1.90 percent by weight molybdenum, between 0.20 and 0.40 percent by weight vanadium, between 0.16 and 0.25 percent by weight nitrogen and up to 0.30 percent by weight nickel.

The 440C stainless steel includes 0.95-1.20 percent by weight carbon, up to 1.00 percent by weight silicon, up to 1.0 percent by weight manganese, 16 to 18 percent by weight chromium, 0.40 to 0.65 percent by weight molybdenum, up to 0.04 weight percent phosphorous, up to 0.75 weight percent nickel, up to 0.75 weight percent copper and up to 0.03 weight percent sulfur.

Cronidur 30® includes between 0.25 and 0.35 percent by weight carbon, up to 1.00 percent by weight silicon, up to 1.00 percent by weight manganese, between 14.00 and 16.00 percent by weight chromium, up to 0.50 percent by weight nickel, between 0.85 and 1.10 percent by weight molybdenum and between 0.30 and 0.50 percent by weight nitrogen.

Referring to FIGS. 6 and 7, an aircraft wing includes a main fixed wing portion 1 and a single slotted trailing edge flap arrangement 2. The flap arrangement 2 includes a main element 3 and an auxiliary flap element 4 supported by the main flap element 3. The main flap element 3 is pivotally supported from the fixed wing portion 1 by a drop hinge linkage arrangement 5. The drop hinge linkage arrangement includes a fixed strut 5A, a hinge point 5B and a drop link 5C. The fixed strut 5A is mounted to the fixed wing portion 1 and carries the hinge point 5B. The drop link 5c connects the main flap element 3 to the hinge point 5B. The auxiliary flap element 4 is supported by a rail 6 mounted to the main flap element 3. The auxiliary flap element 4 is slidably disposed upon the rail 6 for translational movement relative to the main flap element 3. The hinge point 5B has one of the bearing assemblies 100 mounted therein. In one embodiment, the bearing assembly 100 includes the inner member, outer member and/or rollers manufactured from CREN, for example XD15NW® or Cronidur 30®. In one embodiment, the bearing assembly 100 includes the inner member, outer member, and/or rollers manufactured from CRES, for example 440C stainless steel. While the hinge point 5B is described as having one of the bearings 100 therein, the present invention is not limited in this regard as any number of the bearings 100 may be employed in the hinge point 5B. In one embodiment, the hinge point 5B has two of the bearings 100 installed therein; and in another embodiment, the hinge point 5B has two of the bearings 100 installed therein wherein the bearings 100 comprise different sized bearings.

FIG. 6 shows the flap arrangement 2 in its retracted position. The main flap element 3 is stowed, tucked against the trailing edge of the fixed wing portion 1. The auxiliary flap element 4 is stowed in a forward position so as to be nested beneath the rear of the main flap element 3. When stowed, the auxiliary flap element 4 completes the aerofoil profile of the main flap element 3. The trailing edges of the main and auxiliary flap elements 3 and 4 are substantially coincident when the auxiliary flap element is in its retracted, stowed position. As further shown in FIGS. 6 and 7, the main flap element 3 includes an actuator 7 (e.g., a linear or a rotary actuator), which is connected by a linkage arrangement (not shown) to the main flap element 3. In one embodiment, the actuator 7 has one of the bearings 100 (as described herein with reference to FIGS. 22-C2) disposed therein. While the actuator 7 is described as having one of the bearings 100 therein, the present invention is not limited in this regard as any number of the bearings 100 may be employed in the actuator 7. For example, two bearings 100 are employed in a linear actuator. The actuator 7 provides for movement of the main flap element 3 relative to the fixed wing portion 1. In one embodiment, the actuator 7 provides for movement of the drop hinge linkage arrangement 5 which, in turn, provides for movement of the main flap element 3 relative to the fixed wing portion 1.

FIG. 7 illustrates the flap arrangement 2 in its partially extended position. The main flap element 3 is deployed by rotating it downwardly using the drop hinge mechanism 5. Movement of the main flap element 3 is effected by rotary actuator 7 and the bearing 100 installed therein. The auxiliary flap element 4 can remain in its stowed, fully forward position as the main flap element 3 is deployed. In this partially extended configuration, the flap arrangement 2 functions substantially identically to a standard drop hinge flap arrangement. With the main flap element 3 extended by rotation about the drop hinge mechanism 5, a slot 8 is opened up between the fixed wing portion 1 and the main flap element 3. The single slotted flap configuration shown in FIG. 7 enables high pressure air from the lower wing surface to pass through the slot 8 to energize the boundary layer over the upper surface of the main flap element 3 so as to postpone stall in a conventional manner. The single slotted trailing edge flap arrangement 2 is configured for use with other than Boeing® aircraft such as, for example, an Airbus A-350 aircraft.

As shown in FIG. 16, an hourglass bearing assembly is generally designated by the numeral 100. The hourglass bearing assembly 100 includes an inner race 110 defining a radially outwardly facing convex surface 120 having a radius of curvature R1. The hourglass bearing assembly 100 includes an outer race 112 defining two radially inward facing convex inner surfaces 122A and 122B, each having radius of curvature Ro. The outer race 112 is positioned around the inner race 110. A plurality of rollers 115 is disposed between the inner race 110 and the outer race 112 in two rows. Each of the plurality of rollers 115 has an hourglass shape. Each of the plurality of rollers 115 in one row is in rolling engagement with the radially outwardly facing convex surface 120 of the inner race 110 and the radially inward facing convex inner surface 122A of the outer race 112. Each of the plurality of rollers 115 in a second row is in rolling engagement with the radially outwardly facing convex surface 120 of the inner race 110 and the radially inward facing convex inner surface 122B of the outer race 112.

Figure 24:
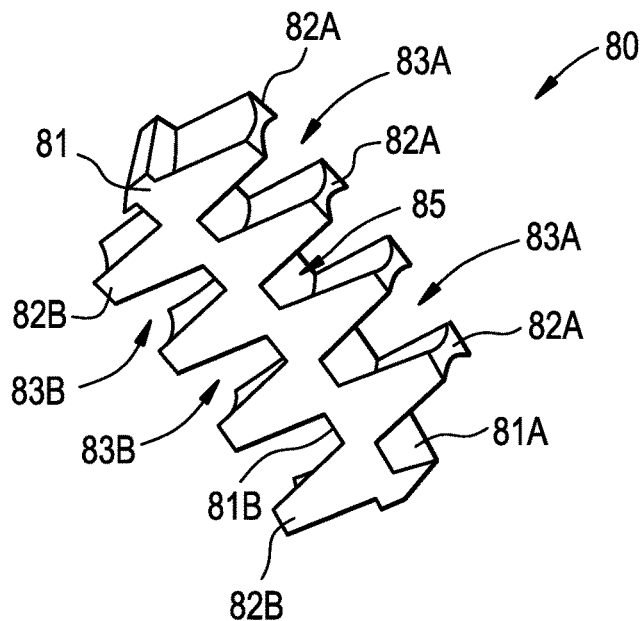
FIG. 24 is a perspective view of a portion of a cage for the hourglass bearing of FIG. 23.
Figure 25:
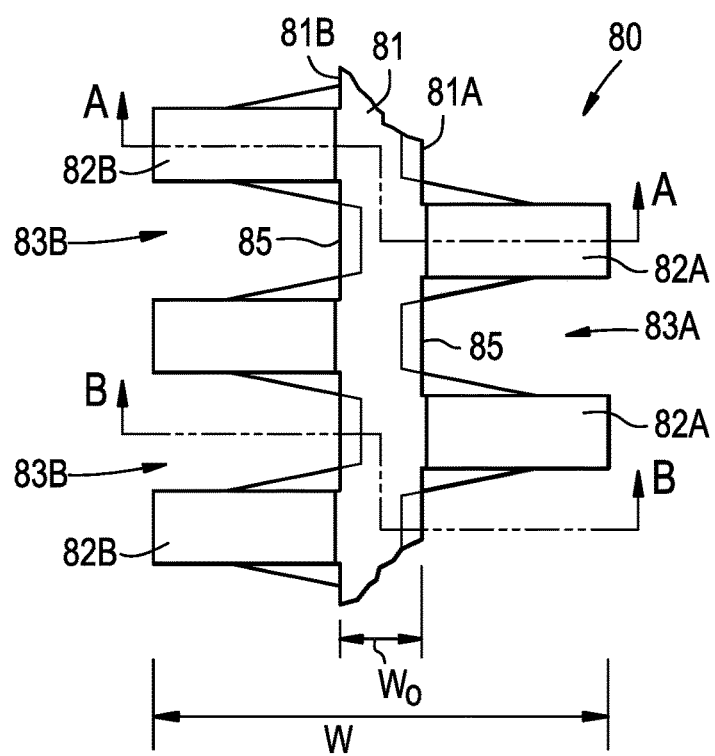
FIG. 25 is a side view of a portion of the cage of FIG. 24, taken from a central axis of the cage.

Referring to FIGS. 24 and 25 a cage 80 for the bearing 100 of FIG. 16 includes an annular ring 81 having a first axially facing surface 81A and a second axially facing surface 81B. The annular ring has a thickness Wo. The first axially facing surface 81A has a plurality of first rails 82A extending therefrom. The second axially facing surface 81B has a plurality of second rails 82B extending therefrom. Adjacent ones of the plurality of first rails 82A define a first pocket 83A therebetween. The first pockets 83A are equally spaced from one another. Adjacent ones of the plurality of second rails 82B define a second pocket 83B therebetween. The second pockets 83B are equally spaced from one another and are symmetrically offset from respective ones of the first pockets 83A. The cage 80 has a width W that extends between respective axial ends of the rails 82A and 82B. In one embodiment, the plurality of first rails 82A and the plurality of second rails 82B are opposite one another so that each of the plurality of the pockets 83A and 83B are opposite one another.

Figure 30:
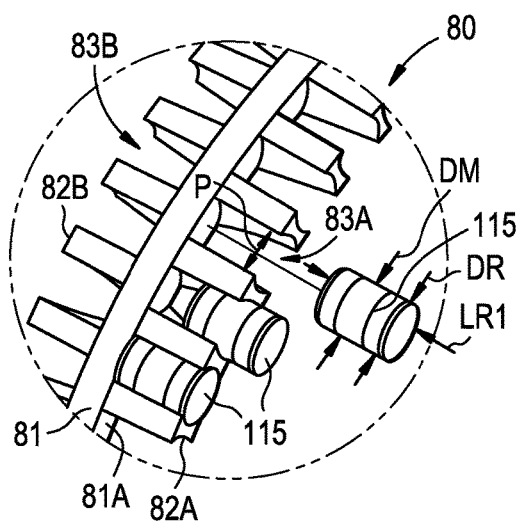
FIG. 30 is an enlarged view of the cage of FIG. 29.
Figure 29:
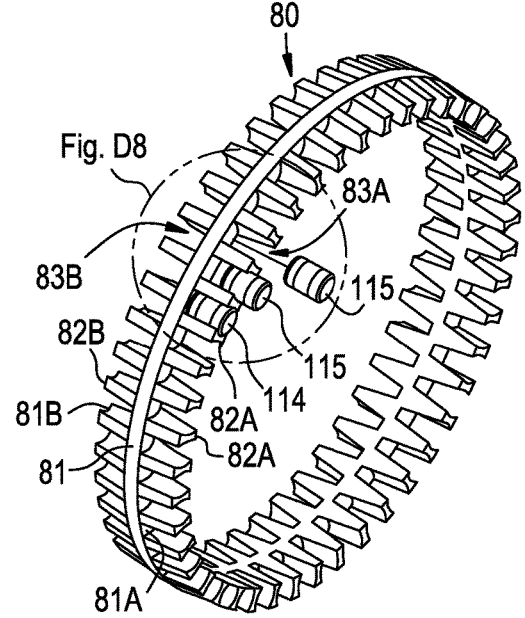
FIG. 29A is a perspective view of the cage of the present invention.

Referring to FIGS. 29 and 30, each of the pockets 83A and 83B are defined by a cylindrical surface 84 formed in opposing circumferential facing portions of the each of the rails 82A and 82B, respectively. The cylindrical surfaces 84 of the pockets 83A are formed, for example, by plunge milling or drilling in an axial direction inwardly towards the first axially facing surface 81A. The cylindrical surfaces 84 of the pockets 83A are formed, for example, by plunge milling or drilling in an axial direction inwardly towards the second axially facing surface 81B. In one embodiment, the cage 80 includes forty two pockets 83A and forty two pockets 83B. However, any number of pockets per side may be employed including but not limited to 45, 48 or 52 pockets per side. Each of the pockets 83A and 83B has a cylindrical pocket diameter P of about 1.5 to 2.5 percent greater than a major diameter of the rollers. In one embodiment, each of the pockets 83A and 83B has a cylindrical pocket diameter of about 1.7 to 2.6 percent greater than a major diameter of the rollers 115. In one embodiment, the cage pockets diameters P are set at 1.024 times the roller diameter; that is cage pockets are 2.4 percent larger than the major diameter of the rollers 115.

Referring to FIGS. 29 and 30, each of the pockets 83A and 83B have a spherical bottom surface 85. In addition to circumferential pocket clearance, there are axial clearances inboard; again when all components are centered. The cross section of this mid-rail resembles a triangle but with curved or crowned sides. This is done to prevent any roller edge loading and potential wears from any roller skewing.

In one embodiment, the cage 80 is manufactured from a high leaded tin bronze per ASTM B505, UNS C93200. However, the present invention is not limited in this regard as other materials may be employed including but not limited high strength manganese bronze (e.g., alloys C86300 or C86500).

The cage 80 is disposed between the inner race 110 and the outer race 112 with one of the plurality of rollers 115 rollingly engaged in each pocket as shown in FIGS. 29 and 30. During operation of the bearing 100, the cage 80 pockets 83A and 83B limit skew of the rollers 115 to improve operation of the bearing 100 for oscillations, for example, oscillations greater than 25 degrees.

Figure 26:
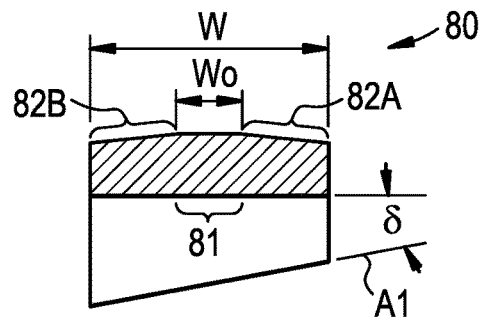
FIG. 26 is a cross sectional view of a portion of the cage of FIG. 25 taken across section A-A.
Figure 27:
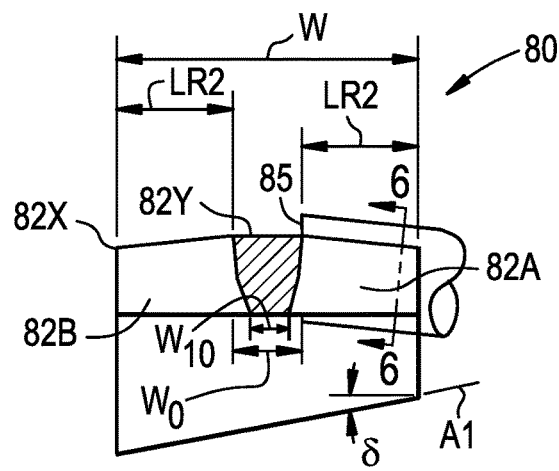
FIG. 27 is a cross sectional view of a portion of the cage of FIG. 25 taken across section B-B.

As shown in FIGS. 26 and 27 the cage defines a contact angle δ between the cage and a central axis of the bearing 100. With the inner and outer rings 110, 112 and rollers 115 centered, axes of the cage 80 pocket 83A and 83B and centers are coincident with roller axes and centers. In other words, the cage pockets 83A and 83B have the same slant or slope as bearing contact angle.

Figure 28:
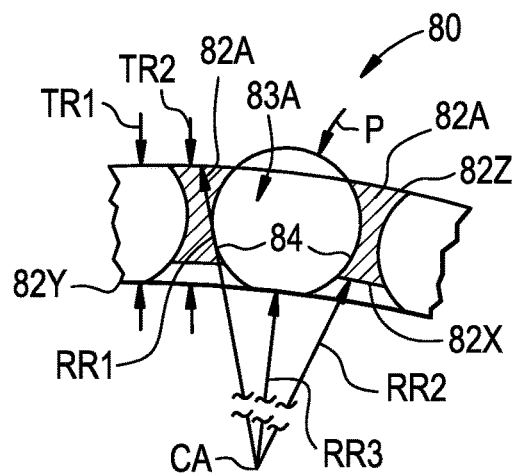
FIG. 28 is a top cross sectional view of a portion of the cage of FIG. 25 taken across line 6-6 and illustrating a cylindrical roller pocket.

As shown in FIG. 28, the cage 80 has a radial thickness TR1 at a central portion of the annular ring 81. Each of the first rails 82A has a radial thickness TR2 at an axially distal end of the first rail 82A. Each of the second rails 82B has a radial thickness TR2 at an axially distal end of the second rail 82B. The rollers 115 have a major diameter DM (see FIG. 30) that is greater than the radial thickness TR of the first rail 82A and the second rail 82B so that the first radius R1 is greater than the second radius R2 and the third radius R3.

As shown in FIG. 28, the cage 81 has a central axis CA. The cage defines a first radius RR1 measured from the central axis CA to a radially outermost surface 82Z of the cage 81. In one embodiment, the radially outermost surface 82Z is cylindrical. The cage 81 defines a second radius RR2 measured from the central axis CA to a radially inwardmost surface 82X located at a juncture with the axially distal end of the first rail 82A. The cage 81 defines a third radius RR3 measured from the central axis CA to a radially innermost axial end 82Y of the first pocket 81A. The second rails 82B and second pockets 83B are configured in a similar manner. The first radius RR1 is greater than the second radius RR2 and the third radius RR3. The third radius RR3 is greater than the second radius RR2, thereby defining a taper between the radially innermost axial end 82Y of the first pocket 81A and the radially inwardmost surface 82X.

Referring to FIGS. 25 and 27, each of the first pockets 83A and each of the second pockets 83B have an axially outward facing convex spherical bottom surface 85. The spherical bottom surfaces have a radius of curvature $R_p$ as shown in FIG. 27.

As shown in FIG. 27, each of the first rails 82A and each of the second rails 82B extend a length LR2 from the pocket bottom 85 such that the width W is two times the length LR plus the width Wo.

In one embodiment, the cage 80 is manufactured from a high leaded tin bronze per ASTM B505, UNS C93200.

The cage 80 is disposed between the inner race 110 and the outer race 112 with one roller of the plurality of rollers 115 rollingly engaged in each pocket. During operation of the bearing 100, the cage 80 causes the rollers to precess or index in response to small angular oscillatory movement between the inner race 110 and the outer race 112 thereby indexing the rollers through high load zones and into lower load zones within the bearing 100.

Figure 31:
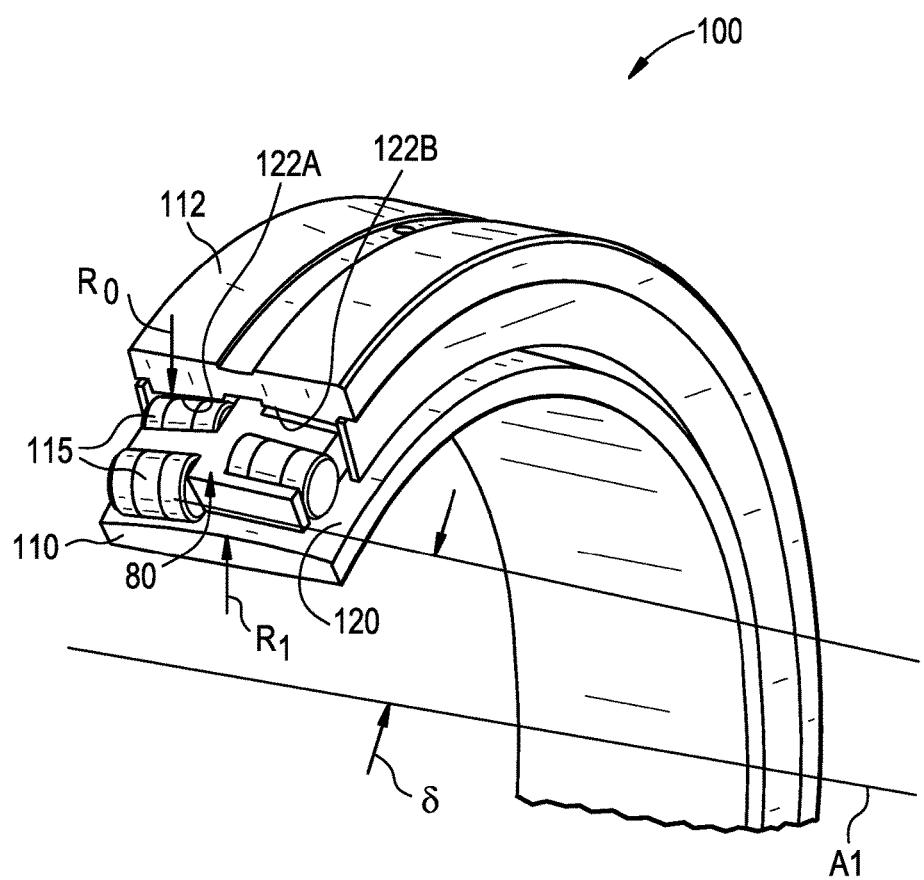
FIG. 31 is a perspective view of the hourglass bearing having the cage of the present invention of FIG. 23, wherein the cage is shown.

As shown in FIGS. 27 and 31, the cage defines a contact angle δ between the cage and a central axis A1 of the bearing 100. The length R1 is greater than an axial width LR1 of the hourglass rollers 115 as shown in FIG. 30.

Referring to FIGS. 6 and 7, an aircraft wing includes a main fixed wing portion 1 and a single slotted trailing edge flap arrangement 2. The flap arrangement 2 includes a main element 3 and an auxiliary flap element 4 supported by the main flap element 3. The main flap element 3 is pivotally supported from the fixed wing portion 1 by a drop hinge linkage arrangement 5. The drop hinge linkage arrangement includes a fixed strut 5a, a hinge point 5b and a drop link 5c. The fixed strut 5a is mounted to the fixed wing portion 1 and carries the hinge point 5b. The drop link 5c connects the main flap element 3 to the hinge point 5b. The auxiliary flap element 4 is supported by a rail 6 mounted to the main flap element 3. The auxiliary flap element 4 is slidably disposed upon the rail 5 for translational movement relative to the main flap element 3. The hinge point 5b has the bearing 100 (as described herein with reference to FIGS. 23-28) mounted therein. The bearing 100 includes the cage 80 as described herein.

FIGS. 6 and 7 show the flap arrangement 2 in its retracted position. The main flap element 3 is stowed, tucked against the trailing edge of the fixed wing portion 1. The auxiliary flap element 4 is stowed in a forward position so as to be nested beneath the rear of the main flap element 3. When stowed, the auxiliary flap element 4 completes the aerofoil profile of the main flap element 3. The trailing edges of the main and auxiliary flap elements 3 and 4 are substantially coincident when the auxiliary flap element is in its retracted, stowed position.

Movement of the main flap element 3 is effected by an actuator 7 (e.g., a linear actuator or a rotary actuator), which is connected by a linkage arrangement (not shown) to the main flap element 3. In one embodiment, the actuator 7 has one of the bearings 100 disposed therein. The bearing 100 includes the cage 80 disposed therein as described herein. While the actuator 7 is described as having one of the bearings 100 therein, the present invention is not limited in this regard as any number of the bearings 100 may be employed in the actuator 7. For example, in a linear actuator 7 one of the bearings 100 is positioned proximate opposing ends of the linear actuator.

FIG. 7 illustrates the flap arrangement 2 in its partially extended position. The main flap element 3 is deployed by rotating it downwardly using the drop hinge mechanism 5. As can be seen from FIG. 6, the auxiliary flap element 4 can remain in its stowed, fully forward position as the main flap element 3 is deployed. In this partially extended configuration, the flap arrangement 2 functions substantially identically to a standard drop hinge flap arrangement. With the main flap element 3 extended by rotation about the drop hinge mechanism 5, a slot 8 is opened up between the fixed wing portion 1 and the main flap element 3. The single slotted flap configuration shown in FIGS. 6 and 7 enables high pressure air from the lower wing surface to pass through the slot 8 to energize the boundary layer over the upper surface of the main flap element 3 so as to postpone stall in a conventional manner.

While the present disclosure has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An edge flap arrangement for an aircraft wing, the arrangement comprising:
    a main flap element and an actuator for moving the main flap element relative to the aircraft wing;
    a linkage arrangement supporting the main flap element from the aircraft wing for movement relative to the aircraft wing, the linkage arrangement including a fixed strut secured to the aircraft wing and a drop link secured to the main flap element, the fixed strut and the drop link being pivotally connected by a hinge point; and
    at least a first hourglass bearing disposed in at least one of the hinge point and the actuator, the first hourglass bearing comprising:
        an inner member defining an inner raceway having a radially outwardly facing convex surface having an inner raceway radius of curvature R1;
        an outer member defining an outer raceway having a radially inward facing convex inner surface having an outer raceway radius of curvature Ro, the outer raceway being positioned around the inner raceway;
        at least one hourglass roller disposed between the inner member and the outer member in rolling engagement with the inner raceway and the outer raceway, the roller comprising;
            a circular cross section symmetrical about a longitudinal axis, a first axial end and a second axial end and an axial width extending between the first axial end and the second axial end,
            an exterior surface extending between the first axial end and the second axial end, the exterior surface defining a concave engagement surface extending outwardly from a central portion of the roller,
            the concave engagement surface having a first radius of curvature R1 extending from the central portion to each of two first transition zones Z1 positioned on opposing sides of the central portion,
            the concave engagement surface having a second radius of curvature R2 extending outwardly from each of the two first transition zones Z1 to each of two second transition zones Z2; and
            the second radius of curvature R2 is greater than the first radius of curvature R1;
        at least one of the outer member, the inner the member, and the at least one hourglass roller being fabricated from at least one of CREN, and 422 Stainless Steel;
        an annular seal assembly snap-fit into the outer race, the annular seal assembly
    comprising,
        a first annular retaining ring defining a first radially outermost portion,
        a second annular retaining ring defining a second radially outermost portion, and
        a resilient ring defining a third radially outermost portion, the resilient ring being disposed between the first annular retaining ring and the second annular retaining ring,
        the first radially outermost portion, the second radially outermost portion and the third radially outermost portion being aligned with one another,
        the resilient ring projecting radially inward from the first annular retaining ring and the second annular retaining ring, and
        the resilient ring being more compressible and flexible than the first annular retaining ring and the second annular retaining ring; and
    a cage disposed between the inner raceway and the outer raceway, the cage comprising;
    an annular ring having a first axial face and a second axial face, a plurality of first rails extending the length from the first axial face and a plurality of second rails extending the length from the second axial face, the length being of a magnitude greater than that of the axial width of the hour glass rollers,
    a plurality of pockets, each of the plurality of pockets defined by opposing circumferentially facing walls of at least one of adjacent pairs of the first rails and adjacent pairs of the second rails, and
    the circumferentially facing walls being concavely formed so that each of the plurality of pockets is cylindrical.

2. The edge flap arrangement of claim 1, wherein the hourglass bearing is disposed in a structure of an aircraft.

3. An edge flap arrangement for an aircraft wing, the arrangement comprising:
    a main flap element and an actuator for moving the main flap element relative to the aircraft wing;
    a linkage arrangement supporting the main flap element from the aircraft wing for movement relative to the aircraft wing, the linkage arrangement including a fixed strut secured to the aircraft wing and a drop link secured to the main flap element, the fixed strut and the drop link being pivotally connected by a hinge point; and
    at least a first hourglass bearing disposed in at least one of the hinge point and the actuator, the first hourglass bearing comprising:
        an inner member defining an inner raceway having a radially outwardly facing convex surface having an inner raceway radius of curvature R1;
        an outer member defining an outer raceway having a radially inward facing convex inner surface having an outer raceway radius of curvature Ro, the outer raceway being positioned around the inner raceway;
        at least one hourglass roller disposed between the inner member and the outer member in rolling engagement with the inner raceway and the outer raceway, the roller comprising;

a circular cross section symmetrical about a longitudinal axis, a first axial end and a second axial end and an axial width extending between the first axial end and the second axial end, an exterior surface extending between the first axial end and the second axial end, the exterior surface defining a concave engagement surface extending outwardly from a central portion of the roller, the concave engagement surface having a first radius of curvature R1 extending from the central portion to each of two first transition zones Z1 positioned on opposing sides of the central portion, the concave engagement surface having a second radius of curvature R2 extending outwardly from each of the two first transition zones Z1 to each of two second transition zones Z2; and the second radius of curvature R2 is greater than the first radius of curvature R1; at least one of the outer member, inner the member and the at least one hourglass roller being fabricated from at least one of CRES and 440C stainless steel; an annular seal assembly snap-fit into the outer race, the annular seal assembly comprising; a first annular retaining ring defining a first radially outermost portion, a second annular retaining ring defining a second radially outermost portion, and a resilient ring defining a third radially outermost portion, the resilient ring being disposed between the first annular retaining ring and the second annular retaining ring, the first radially outermost portion, the second radially outermost portion and the third radially outermost portion being aligned with one another, the resilient ring projecting radially inward from the first annular retaining ring and the second annular retaining ring, and the resilient ring being more compressible and flexible than the first annular retaining ring and the second annular retaining ring; and a cage disposed between the inner raceway and the outer raceway, the cage comprising, an annular ring having a first axial face and a second axial face, a plurality of first rails extending a length from the first axial face and a plurality of second rails extending a length from the second axial face, the length being of a magnitude greater than the axial width of the hourglass rollers, a plurality of pockets, each of the plurality of pockets defined by opposing circumferentially facing walls of at least one of adjacent pairs of the first rails and adjacent pairs of the second rails, and the circumferentially facing walls being arcuately formed so that each of the plurality of pockets is cylindrical.

4. The edge flap arrangement of claim 3, wherein the hourglass bearing is disposed in a structure of an aircraft.

* * * * *